United States Patent
Forchhammer et al.

(10) Patent No.: US 8,263,153 B2
(45) Date of Patent: Sep. 11, 2012

(54) METHOD OF PREVENTING OR REDUCING HAZE IN A BEVERAGE USING SILANE-TREATED SILICA FILTER MEDIA

(75) Inventors: Nynne M. Forchhammer, Hedehusene (DK); Beth Fryksdale, San Jose, CA (US); Keith Hayes, Florence, KY (US); Csilla Kollar, Midland, MI (US); Thomas H. Lane, Midland, MI (US); Anthony Revis, Freeland, MI (US)

(73) Assignee: Dow Corning Corporation, Midland, MI (US)

( * ) Notice: Subject to any disclaimer, the term of this patent is extended or adjusted under 35 U.S.C. 154(b) by 1054 days.

(21) Appl. No.: 11/547,986

(22) PCT Filed: Apr. 19, 2005

(86) PCT No.: PCT/US2005/013435
§ 371 (c)(1),
(2), (4) Date: Apr. 22, 2009

(87) PCT Pub. No.: WO2005/117616
PCT Pub. Date: Dec. 15, 2005

(65) Prior Publication Data
US 2009/0214701 A1    Aug. 27, 2009

Related U.S. Application Data

(60) Provisional application No. 60/564,932, filed on Apr. 23, 2004.

(51) Int. Cl.
*A23L 2/72* (2006.01)
(52) U.S. Cl. ....... 426/422; 426/11; 426/330.3; 426/423; 426/424
(58) Field of Classification Search .................. 426/422, 426/330.3, 423, 424
See application file for complete search history.

(56) References Cited

U.S. PATENT DOCUMENTS

| | | | |
|---|---|---|---|
| 3,818,111 A | 6/1974 | Hoover | |
| 3,958,023 A | 5/1976 | Butterworth | |
| 4,282,261 A | 8/1981 | Greene | |
| 4,880,643 A | 11/1989 | Bamforth et al. | |
| 5,110,784 A | 5/1992 | Williams et al. | |
| 5,194,279 A | 3/1993 | Okel | |
| 5,922,449 A | 7/1999 | Revis | |
| 6,001,406 A | 12/1999 | Katzke et al. | |
| 6,638,354 B2 * | 10/2003 | Stephens et al. | 106/624 |

FOREIGN PATENT DOCUMENTS

| WO | WO 02/11882 A1 | 2/2002 |
|---|---|---|
| WO | WO 03/035723 A1 | 5/2003 |

OTHER PUBLICATIONS

Siebert et al., "Mechanisms of Beer Colloidal Stabilization", American Society of Brewing Chemists, Inc., 1997, Publication No. J-1997-0425-01R, pp. 73-78.

* cited by examiner

*Primary Examiner* — Anthony Weier
(74) *Attorney, Agent, or Firm* — Perkisn Coie LLP.; Viola T. Kung

(57) ABSTRACT

The present invention provides a method for preventing or reducing haze development in a beverage. Silane-treated silica filter media are synthesized. By contacting the beverage with the silane-treated silica filter, one or more haze-forming components bind to the silane-treated silica filter media and are removed by filtration. In addition, particulates in the beverage are removed by filtration. Beverages that tend to develop haze on standing and/or chilling such as alcoholic, fruit, and vegetable beverages, are suitable for the present invention. This haze in a beverage is mainly caused by polyphenols and proteins. The present invention provides a method that can reduce the levels of both polyphenols and proteins. The silica filter media useful for the present method include rice hull ash, oat hull ash, or diatomaceous earth.

26 Claims, 1 Drawing Sheet

METHOD OF PREVENTING OR REDUCING HAZE IN A BEVERAGE USING SILANE-TREATED SILICA FILTER MEDIA

This application is a National Stage of International Application PCT/US2005/013435, filed Apr. 19, 2005, published Dec. 15, 2005, under PCT Article 21(2) in English; which claims the priority of U.S. Provisional Application No. 60/564,932, filed Apr. 23, 2004.

FIELD OF THE INVENTION

This invention relates to a method for preventing or reducing haze development in alcoholic, fruit, and vegetable beverages. More particularly, the invention relates to the use of silane-treated silica filter media such as rice hull ash for removing one or more haze components from a beverage such as beer.

BACKGROUND OF THE INVENTION

The development of haze in alcoholic and fruit beverages has long been a problem. Development of haze in beverages is undesirable from the viewpoint of product aesthetics and eye-appeal. In addition, haze development can result in loss of product color as well as taste. Solutions to this problem have been attempted by several different approaches. One of the commonly employed methods is reducing the temperatures of the beverage to 20-30° F. to cause haze formation. During such chilling, the haze precursors separate out as the so-called "haze" which can be then be separated using known techniques such as filtration. In many cases, such treatment by chilling is not completely effective, and several chilling and precipitation treatments are required. As an alternative to chill processing, attempts have been made to determine the amount of the precursors of haze in the grains employed in the production of specific beverages, e.g., by extraction of the malt employed in the production of beer. As a result of such determinations, grains of low haze-precursor content can be selected to produce beverages of low potential haze. Such procedures are costly and time-consuming. Although this approach can result in amelioration of the haze problem, it rarely can result in elimination of the haze problem.

It has long been recognized that the most frequent cause of haze in packaged beer is protein-polyphenol interaction (Compton, J. Beer quality and taste methodology. In the *Practical Brewer*, $2^{nd}$ Ed. H. M. Broderick, Ed. Master Brewers Assoc. Am. Madison, Wis., pp. 288-308, 1977). Two basic approaches to stabilize beer, or at least to delay the onset of haze formation, have been developed: (a) reducing the concentration of the haze-active protein, or (b) reducing the concentration of the haze-active polyphenol. Haze-active polyphenol can be removed by adsorption with polyamide or polyvinylpolypyrrolidone (PVPP), or by fining. Haze-active proteins, but not foam-active proteins that form the foam in a beverage, can be removed by silica gel adsorption. The foam that is often present on a glass of beer or other beverage is considered a desirable quality of a beverage such as beer. The specificity of silica gel toward haze-active proteins occurs because silica gel binds to the proline residues in a protein; which are the same sites where polyphenols attach to create haze. (Siebert, et al., *J. Am. Soc. Brew. Chem.* 55: 73-38 (1997)).

In fruit beverages, the haze problem has been treated primarily through the use of enzymes, which hydrolyze the proteins normally forming haze with the phenolic components of the fruit preparation.

U.S. Pat. No. 3,958,023 discloses a method of treating a liquid derived from one or more vegetables or fruits to reduce the tendency of chill haze formation in said liquid, said method including a filtration step and the addition of one or more chill haze control agents, the improvement comprising including in a precoat or after precoat layer in the filter media used in said filtration step at least one chill haze control agent, and adding at least one chill haze control agent as body feed to said liquid prior to said filtration step, said chill haze control agents being selected from the group comprising hectorite, acid activated bentonite, acid treated acid activated bentonite, polyvinyl pyrrolidone, polyvinyl polypyrrolidone, natural magnesium silicates, synthetic metal silicates, and acid treated synthetic magnesium silicates containing less than 14 wt. percent MgO.

U.S. Pat. No. 4,282,261 discloses a process for removal of haze precursors from unstable beverages which comprises the step of contacting said beverage in a haze-free condition and at ambient temperature with a positive-charge modified porous medium comprised of fine particulate, the charge being modified with a polyamido-polyamine epichlorhydrin cationic resin, to form a precipitate and removing said precipitate from said beverage at ambient temperature.

U.S. Pat. No. 6,011,406 discloses a method for stabilizing a beverage containing haze-causing substances. The method comprises: (a) contacting a clarified beverage with a water-insoluble porous hydrophilic matrix to which ion exchanging groups are covalently bound, which is capable of adsorbing both haze forming proteins and polyphenolic compounds, and removing a portion, but not all, of the haze forming proteins and/or polyphenolic compounds; and (b) recovering the beverage from the matrix.

There is a need for an improved and less costly process that is suitable for preventing or reducing haze development in beverages. Such a system uses low-cost raw materials and is suitable for a large-scale production and requires no pretreatment of a sample.

SUMMARY OF THE INVENTION

The present invention is directed to a method for preventing haze formation and/or reducing haze from a beverage. Beverages that tend to develop haze on standing and/or chilling are suitable for the present invention. Such beverages include alcoholic, fruit, and vegetable beverages.

The present method comprises the steps of (a) filtering a beverage sample through silica filter media whose surface-active groups have been reacted with one or more silanes, (b) binding one or more haze-forming substances to the silica filter media, and (c) collecting the flow-through beverage sample. The silica filter media useful for the present method include rice hull ash, oat hull ash, or diatomaceous earth. Silanes useful for treating the silica filter media in general comprise a hydrolyzable moiety such as alkoxy, halogen, hydroxy, aryloxy, amino, carboxy, cyano, aminoacyl, acylamino, alkyl ester, aryl ester, which reacts with the active group on the silica filter media.

The haze-forming substances such as polyphenols and haze-active proteins are bound to the silane-treated filter media and removed from the beverage in one single filtration step. In addition, particulates such as microorganisms, yeast and other debris are also removed from the beverage by the present method.

DETAILED DESCRIPTION OF THE INVENTION

Figure 1:
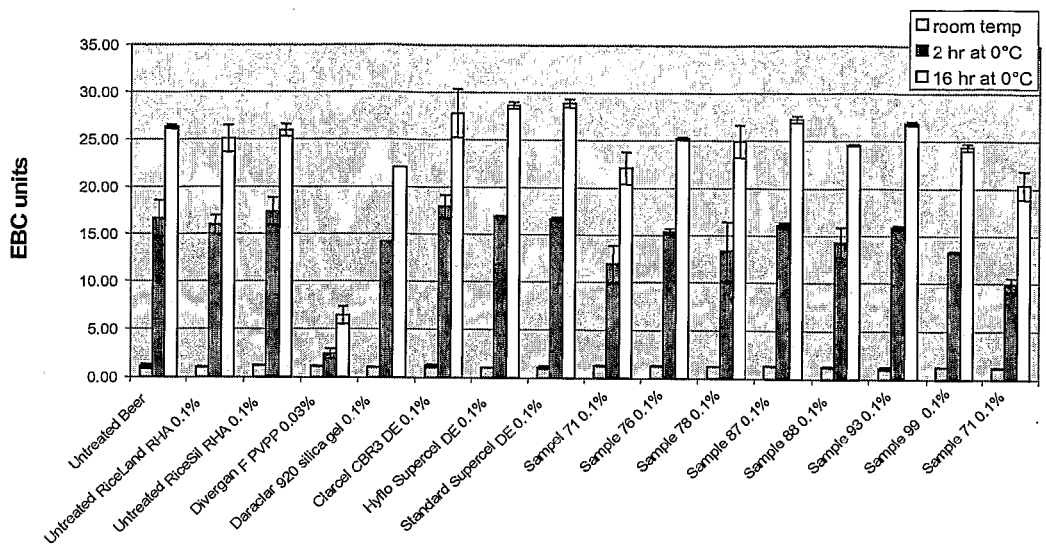
FIG. 1 shows effects of untreated RHA, commercial stabilizers, and silane-treated silica filter media at 0.03 or 0.1% dose on beer haze.

The present invention provides a method for preventing or reducing haze development in a beverage. Silane-treated silica filter media are synthesized. By contacting the beverage with the silane-treated silica filter, one or more haze-forming components bind to the silane-treated silica filter media and are removed by filtration. In addition, particulates in the beverage are removed by filtration.

Beverages that tend to develop haze on standing and/or chilling are suitable for the present invention. Such beverages include alcoholic, fruit, and vegetable beverages. Alcoholic beverages include those that are made by the fermentation of hopped malt wort, such as beer, ales, lagers, stouts and Happoshu. Alcoholic beverages also include those that are made by the fermentation of fruits, such as wine, whiskey, fortified wine products (sherry, brandy and cognac), rum, liquors and cordials. Fruit beverages include those derived from fruit origin such as fruit juices, for example, apple, cranberry, grape, citrus fruit, peach, pear, plum, apricot and nectarine juices. Vegetable beverages include those derived from vegetable origins such as vegetable juices such as tomato, carrot, celery, parsley, spinach, wheatgrass, kale, cucumber, pine needles, dropwort, mugwort, beet, radish, arrowroot juices. The present invention is particularly suitable for reducing haze in beer.

This haze in a beverage is mainly caused by polyphenols and proteins, which are able to react to larger molecules via hydrogen bridges. The haze-forming proteins in general have molecular weight within the range of 30-60 kDa, although the range may differ depending on the source. The haze-forming polyphenols include tannins and anthocyanogens. (U.S. Pat. No. 6,001,406) To reduce the haze in a beverage, it is useful to partially remove the polyphenols, the proteins, or both. The present invention provides a method that can reduce the levels of both polyphenols and proteins, whereas currently available methods only remove either proteins or polyphenols.

The present method is useful for removing haze and particulate matter that are already formed in a given beverage. The present method is also useful for removing potentially haze-forming substances, such as haze-forming protein and polyphenols, in order to render haze-formation more difficult. The present method is additionally useful for removing contaminated microorganism or reducing microorganism activity, which may be a source of haze.

The amount of haze-forming substances and their tendency to form haze depend on several factors. For example, each beer is unique in composition depending on the brewery's selection of process variables, quality of hop and barley etc. This means that an acceptable level of haze as measured by commonly accepted tests might vary between type of beer and/or brewery. In connection with the invention, fixed limits for haze are therefore difficult to set. As a general guideline, the haze level is considered reduced when haze-forming proteins and/or polyphenols (alone or in combination) have been decreased by at least 10%, preferably 15%, more preferably 20%, as a consequence of employing the invention. Total proteins in a beverage include all proteins, for example, both desirable foam-active proteins and non-desirable haze-foaming proteins. Total protein concentration in a beverage can be measured by BCA (bicinchoninic acid) Assay (Smith, *Anal. Biochem.* 150, 76-85 (1985)). The BCA assay measures all proteins by quantitating the amount of peptide bonds in a sample. Peptide bonds reduce $Cu^{+2}$ to $Cu^+$ under alkaline conditions. Each $Cu^+$ then chelates two molecules of BCA, generating a colored complex, the absorbance of which is related to the total protein concentration. The BCA assay detects protein in the range of 125 µg/ml to 2000 µg/ml.

The concentration of foam active proteins, which are mostly hydrophobic proteins, can be measured by Bradford assay (Siebert, et al. *J. Am. Soc. Brew. Chem.* 55: 73-78 (1997)), which is selective for measurement of hydrophobic proteins. Under acidic conditions, the absorbance of Coomassie® Blue G-250 shifts from 465 nm to 595 nm upon binding to proteins. The Coomassie® dye binds predominantly to hydrophobic and positively charged proteins such as arginine, histidine and lysine. These aforementioned hydrophobic and positively charged proteins are generally recognized to be the largest contributors to beer foam. The Bradford Assay detects protein in the range of 40 µg/ml to 250 µg/ml.

The concentration of haze-active protein in general, can be calculated by subtracting the foam-active protein concentration from the total protein concentration. The amounts of foam-active proteins and haze-active proteins in a beverage vary depending on the specific beverage. In beer, the foam-active proteins constitute about 5-50% of the total protein and the haze-active proteins constitute about 50-95% of the total protein. For example, the foam-active proteins are about 20% of the total protein and the haze-active proteins are about 80% of the total protein in beer. The goal for preventing or reducing haze development in a beverage is not to remove all the proteins, particularly foam-active proteins, because this may affect the character of a specific beverage, such as flavor, aroma, and foaming tendencies. The goal for preventing or reducing haze is to reduce the level of haze-forming proteins or polyphenols by at least 10%, preferably 15%, more preferably 20%.

Beverage haze can be measured by various methods known to a skilled person in the art. For example, the Chapon cooling method is used to predict chill haze in filtered beer. Haze is measured after beverage temperature is decreased for a fixed amount of time. Little or no increase in haze indicates good haze stability while a steep increase indicates poor stability.

Using this method, the turbidity of a beverage sample at room temperature is first measured. The beverage sample is then cooled down to 0° C. in a water bath containing propylene glycol. Aliquots of the sample are taken out at regular intervals such as 1, 2, 12, and 24 hours to measure turbidity. The turbidity of an aliquot is measured immediately after it is removed from the 0° C. water bath. Turbidity is expressed in EBC units (European Brewing Convention). A significant rise in turbidity from the initial room temperature sample indicates poor physical stability, as the beverage sample is predisposed to forming chill haze. A slight rise in chill haze upon cooling constitutes good physical stability.

Another method for measuring beverage haze is forced-haze stability method. This method measures haze formed after a beverage sample has been subjected to heat/chill temperature cycling. A beverage sample stored at a high temperature for a short period results in a chill-haze similar to that formed over prolonged storage at room temperature. This method is a stronger predictive tool than the Chapon cooling method; though it is more time consuming.

Using the forced-haze stability method, the turbidity of a beverage sample at room temperature is first measured. The sample is then placed in a 0° C. water bath and incubated for 24 hours. The turbidity is measured after 24 hours as "total haze after chilling". The sample is then incubated at 50° C. for 3 days, followed by 0° C. for 24 hours, and the turbidity of the sample is measured.

The 50° C./0° C. cycle is repeated and the turbidity is measured again. A significant rise in turbidity measurements after 3 and 6 days indicates poor physical stability. A slight rise in turbidity measurements after 3 and 6 days constitutes good physical stability.

The present invention provides a filtration method employing silane-treated silica filter media to reduce haze. Filtration is the removal of particulates by passing a feed stream through a porous media. Particulates are captured on the filter media through a variety of mechanisms including physical entrapment, and binding to the media.

Filter media, also known as filter aids, can be loose particulate or structured material. They are solid materials in a particulate form, insoluble in the liquid to be filtered; they are added to the liquid or are coated upon a filter or filter support. The purpose of using filter media is to speed up filtration, reduce fouling of the filter surface, reduce cracking of the filter layer, or otherwise to improve filtration characteristics. Filter media are often described according to their physical form. Some filter media are essentially discrete membranes, which function by retaining contaminants upon the surface of the membrane (surface filters). These filter media primarily operate via mechanical straining, and it is necessary that the pore size of the filter medium be smaller than the particle size of the contaminants that are to be removed from the fluid. Such a filter medium normally exhibits low flow rates and a tendency to clog rapidly.

Other filter media take the form of a porous cake or bed of fine fibrous or particulate material deposited on a porous support or substrate. The solution being filtered must wend its way through a path of pores formed in the interstices of the fine material, leaving particulate contaminants to be retained by the filter material. Because of the deepness of the filter material, the filters are called depth filters (as opposed to surface filters). The ability to achieve the required removal of suspended particulate contaminants with a filter medium of significantly larger pore size is attractive inasmuch as it allows higher flow rates. Furthermore, the filters have a higher capacity to retain particulates, thus having a reduced tendency to clog.

The present invention utilizes silane-treated silica media filter of various types to remove haze-forming substances as well as particulates in alcoholic, fruit, and vegetable beverages.

The term "particulates" refers to macroscopic insolubles or microscopic particulates. Particulates are often undesirable in a beverage; particulates can also be a source of haze. Macroscopic particulates are those that are visible to the human eye, including, but not limited to precipitates, inclusion bodies, and crystals. Inclusion bodies consist of insoluble and incorrectly folded protein in the cellular compartment. Crystals are formed from supersaturated solutions by aggregation of molecules, occurring in an ordered, repetitive fashion. Precipitates are amorphous form from random aggregation. Macroscopic particulates can be of organic or inorganic origin; they can be derived from the interaction between protein and protein, salt and protein, salt and salt, protein and polymer, etc. Microscopic particulates are those that can be seen under a microscope. Examples of microscopic particulates include microorganisms. Microorganisms when overgrown in a beverage can also form macroscopic particulates. Microorganisms suitable to be captured and removed from a beverage by the present invention are gram-positive bacteria, gram-negative bacteria, fungi, yeast, mold, virus, etc.

One problem in the brewing, winery, juice and other beverages industry is microbial contamination. Heat sterilization and size-based filtration are the most commonly used processes to remove microbial contamination. The main drawback of heat sterilization is that its application is limited to products that are not affected by high temperature. Sized-based filtration has the disadvantages of being expensive and time consuming. In addition, it cannot be used for processes in which the desired components are of the same size as bacteria. The present invention is advantageous in that it can remove haze-forming substances (such as haze-active proteins and polyphenols) and particulates (such as microorganisms) in a single filtration step; therefore, it is useful to prevent or reduce haze from a variety of beverages that have different components.

The feature of this invention is using treated silica filter media in a filtration process to simultaneously bind soluble substances onto the silica filter media and capture particulates from a solution by filtration. The present invention does not require a pre-filtration step. Soluble haze-forming substances bind to the silane-treated silica filter media through different mechanisms such as hydrophilic, hydrophobic, affinity and/or electrostatic interactions. Silica filter media useful for this invention have surfaces suitable for treatment with silanes and structural characteristics suitable for industrial filtration applications. Examples of silica filter media include, but are not limited to, rice hull ash, oat hull ash, diatomaceous earth, perlite, talc, and clay.

Rice hull ash is a byproduct of rice farming. Each grain of rice is protected with an outer hull, which accounts for 17-24% of the rough weight of the harvested product. Rice hulls consist of 71-87% (w/w) organic materials, such as cellulose and 13-29% (w/w) inorganic materials. A significant portion of the inorganic fraction, 87-97% (w/w) is silica ($SiO_2$). Currently, the inedible rice hulls are used as a source of fuel, fertilizer, and in insulation applications. When the rice hulls are burned, a structured silica material (often greater than 90%) can be produced as a byproduct. Rice hull ash (RHA) has larger surface area and more porous-channeled structure compared with other loose silica filter media. These characteristics make the RHA a preferred treated filter substrate for this invention.

Diatomaceous earth (Diatomite) is a sedimentary silica deposit, composed of the fossilized skeletons of diatoms, one celled algae-like plants which accumulate in marine or fresh water environments. The honeycomb silica structures give diatomite useful characteristics such as absorptive capacity and surface area, chemical stability, and low bulk density. Diatomite contains 90% $SiO_2$ plus Al, Fe, Ca and Mg oxides.

Perlite is a generic term for a naturally occurring siliceous volcanic rock that can be expanded with heat treatment. Expanded perlite can be manufactured to weigh as little as 2 pounds per cubic foot (32 kg/m$^3$). Since perlite is a form of natural glass, it is classified as chemically inert and has a pH of approximately 7. Perlite consists of silica, aluminum, potassium oxide, sodium oxide, iron, calcium oxide, and magnesium oxide. After milling, perlite has a porous structure that is suitable for filtration of coarse microparticulates from liquids it is suitable for depth filtration.

Talc (talcum) is a natural hydrous magnesium silicate, $3 MgO.4SiO_2.H_2O$. Clay is hydrated aluminum silicate, $Al_2O_3.SiO_2.xH_2O$. Mixtures of the above silica filter media substrates can also be used to achieve the best filtration and cost performance. The rice hull ash or diatomaceous earth has optionally undergone various purification and/or leaching steps before the surface silane treatment.

Silica filter media are treated by binding a predetermined amount of functional silane (or silanes) to the surface. The treated silica filter media capture components, for example, by electrostatic, hydrophilic, hydrophobic, affinity interactions, and/or by physical entrapment. By electrostatic interaction, the charged silica filter media bind to materials in a sample that have the opposite charge. By hydrophilic interaction, the portion of the silica filter media that has a strong affinity for water attracts the polar group of the materials by van der Waals interaction. By hydrophobic interaction, the portion of the silica filter media that contains long hydrocarbon chains attracts the non-polar groups of the materials.

The silane-treated silica filter media preferably have a similar or improved flow rate compared with the non-treated silica filter media. It is known that silica gel binds to haze-active proteins but not polyphenols. The silane-treated silica filter media not only bind to haze-active proteins but also bind to polyphenols. Therefore, the present invention is suitable to reduce haze in a variety of beverages, regardless whether the haze is caused by haze-active proteins or polyphenols.

The form of silica filter media substrate materials can be any form suitable for the application, such as spheres, fibers, filaments, sheets, slabs, discs, blocks, films, and others. They can be manufactured into cartridges, disks, plates, membranes, woven materials, screens, etc. For example, bulk filtration in a brewery often use plate and frame filter presses (in Fermented Beverage Production, $2^{nd}$ Ed. by Lea and Piggott, P. 368-373). The specific surface area of the untreated silica filter media is preferred to be larger than 1 $m^2/g$; more preferred to be larger than 10 $m^2/g$. Silica filter media with a larger surface area are preferable because they allow more treatment on the surface. In addition, media with large pores improve the filtration rate. However, larger pore materials have relatively lower surface area. The balance of large surface area and large pore size results in effective surface filtration treatment and filtration rate. The surface characteristics of these substrates can be evaluated by techniques such as NMR (Nuclear Magnetic Resonance and other techniques), SEM (Scanning Electron Microscopy), BET (Brunauer-Emmett-Teller) surface area measurement technique, and Carbon-hydrogen-nitrogen content can be determined by combustion techniques, which are well known to the art.

Silanes suitable for surface treatment of silica filter media can be any type of organosilanes, ionic or non-ionic. The general formula of a suitable silane is $(R^1)_xSi(R^2)_{3-x}R^3$, wherein $R^1$ is typically a hydrolysable moiety (such as alkoxy, halogen, hydroxy, aryloxy, amino, amide, methacrylate, mercapto, carbonyl, urethane, pyrrole, carboxy, cyano, aminoacyl, or acylamino, alkyl ester, or aryl ester), which reacts with the active group on the silica filter media; a preferred hydrolysable moiety is alkoxy group, for example, a methoxy or an ethoxy group;

$1 \leq X \leq 3$, more than one siloxane bond can be formed between the filter particle and silane;

$R^2$ can be any carbon-bearing moiety that does not react with the filter surface during treatment process, such as substituted or unsubstituted alkyl, alkenyl, alkaryl, alkcycloalkyl, aryl, cycloalkyl, cycloalkenyl, heteroaryl, heterocyclic, cycloalkaryl, cycloakenylaryl, alkcycloalkaryl, alkcycloalkenyaryl, or arylalkaryl;

$R^3$ can be any organic containing moiety that remains chemically attached to the silicon atom once the surface reaction is completed, and preferably it can interact with the component of interest during filtration; for example $R_3$ is hydrogen, alkyl, alkenyl, alkaryl, alkcycloalkyl, aryl, cycloalkyl, cycloalkenyl, heteroaryl, heterocyclic, cycloalkaryl, cycloakenylaryl, alkcycloalkaryl, alkcycloalkenyaryl, arylakaryl, alkoxy, halogen, hydroxy, aryloxy, amino, amide, methacrylate, mercapto, carbonyl, urethane, pyrrole, alkyl ester, aryl ester, carboxy, sulphonate, cyano, aminoacyl, acylamino, epoxy, phosphonate, isothiouronium, thiouronium, alkylamino, quaternary ammonium, trialkylammonium, alkyl epoxy, alkyl urea, alkyl imidazole, or alkylisothiouronium;

wherein the hydrogen of said alkyl, alkenyl, aryl, cycloalkyl, cycloalkenyl, heteroaryl, and heterocyclic is optionally substituted by halogen, hydroxy, amino, carboxy, or cyano.

One or more silanes can be covalently bound to the surface of the hydroxyl bearing porous silica filter media. The surface area of the silica filter media limits the amount of the silanes bound.

Silanes useful for treating silica in this invention preferably have one or more moieties selected from the group consisting of alkoxy, quaternary ammonium, aryl, epoxy, amino, urea, methacrylate, imidazole, carboxy, carbonyl, isocyano, isothiouronium, ether, phosphonate, sulfonate, urethane, ureido, sulfhydryl, carboxylate, amide, carbonyl, pyrrole, and ionic. Examples for silanes having an alkoxy moiety are mono-, di-, or trialkoxysilanes, such as n-octadecyltriethoxysilane, n-octytriethoxysilane and phenyltriethoxysilane.

Examples of silanes having a quaternary ammonium moiety are 3-(trimethoxysilyl)propyloctadecyldimethylammoniumchloride, N-trimethoxysilylpropyl-N,N,N-trimethylammoniumchloride, or 3-(N-styrylmethyl-2-aminoethylamino)-propyltrimethoxysilane hydrochloride. Examples of silanes having an aryl moiety are 3-(trimethoxysilyl)-2-(p,m-chlandomethyl)-phenylethane, 2-hydroxy-4-(3-triethoxysilylpropoxy)-diphenylketone, ((chloromethyl)phenylethyl)trimethoxysilane and phenyldimethylethoxysilane. Examples of silanes having an epoxy moiety are 3-glycidoxypropyltrimethoxysilane and 2-(3,4-epoxycyclohexyl)ethyltrimethoxysilane. Examples of silanes having an amino moiety are 3-aminopropyltrimethoxysilane, N-(2-aminoethyl)-3-aminopropyltrimethoxysilane, trimethoxysilylpropyldiethylenetriamine, 2-(trimethoxysilylethyl)pyridine, N-(3-trimethoxysilylpropyl)pyrrole, trimethoxysilylpropyl polyethyleneimine, bis-(2-hydroxyethyl)-3-aminopropyltriethoxysilane, and bis(2-hydroxyethyl)-3-aminopropyltriethoxysilane.

Examples of silanes having an urea moiety are N-(triethoxysilylpropyl)urea and N-1-phenylethyl-N'-triethoxysilylpropylurea. An example of silanes having a methacrylate moiety is 3-(trimethoxysilyl)propyl methacrylate. An example of silanes having a sulfhydryl moiety is 3-mercaptopropyltriethoxysilane. Examples of silanes having an imidazole moiety are N-[3-(triethoxysilyl)propyl]imidazole and N-(3-triethoxysilylpropyl)-4,5-dihydroimidazole. Examples of ionic silanes are 3-(trimethoxysilyl)propyl-ethylenediamine triacetic acid trisodium salt; and 3-(trihydroxysilyl)propylmethylphosphonate sodium salt. An examples of silanes having a carbonyl moiety is 3-(triethoxysilyl)propylsuccinic anhydride. Examples of silanes having an isocyano moiety are tris(3-trimethoxysilylpropyl)isocyanurate and 3-isocyanatopropyltriethoxysilane. Examples of silanes having an ether moiety are bis[(3-methyldimethoxysilyl)propyl]-polypropylene oxide and N-(triethoxysilylpropyl)-O-polyethylene oxide urethane.

An example of a silane having a sulfonate moiety is 2-(4-chlorosulfonylphenyl)-ethyltrichlorosilane. An example of a silane having a isothiourium moiety is trimethoxysilylpropylisothiouronium chloride. Examples of silanes having an amide moiety are triethoxysilylpropylethyl-carbamate, N-(3-triethoxysilylpropyl)-gluconamide, and N-(triethoxysilylpropyl)-4-hydroxybutyramide. Examples of silanes having a urethane moiety are N-(triethoxysilylpropyl)-O-polyethylene oxide urethane and O-(propargyloxy)-N-(triethoxysilylpropyl)urethane.

Silica filter media can also be treated with more than one silanes such as N-trimethoxysilylpropyl-N,N,N-trimethylammonium chloride and bis(2-hydroxyethyl)-3-aminopropyltriethoxysilane; 3-aminopropyltrimethoxysilane and N-(triethoxysilylpropyl)-O-polyethylene oxide urethane; 3-trihydrosilylpropylmethylphosphonate, sodium salt and N-(triethoxysilylpropyl)-O-polyethylene oxide urethane; N-trimethoxysilylpropyl-N,N,N—Cl, trimethylammonium chloride and (3-glycidoxypropyl)trimethoxysilane; 3-trihydrosilylpropylmethylphosphonate, sodium salt and bis-(2-hydroxyethyl)-3-aminopropyltriethoxysilane; 3-(N-styrylmethyl-2-aminoethylamino)-propyltrimethoxysilane hydrochloride and N-(triethoxysilylpropyl)-O-polyethylene oxide urethane; 2-(trimethoxysilylethyl)pyridine and N-(3-triethoxysilylpropyl)-gluconamide; N-triethoxysilylpropyl-N,N,N—Cl, trimethylammonium chloride and N-(3-triethoxysilylpropyl)-gluconamide; N-trimethoxysilylpropyl-N,N,N—Cl, trimethylammonium chloride and 2-hydroxy-4-(3-triethoxysilylpropoxy)-diphenylketone; 3-mercaptopropyltriethoxysilane and N-(triethoxysilylpropyl)-O-polyethylene oxide urethane; 3-(triethoxysilyl)propylsuccinic anhydride and N-(triethoxysilylpropyl)-O-polyethylene oxide urethane; trimethoxysilylpropyl-ethylenediamine, triacetic acid, trisodium salt and N-(triethoxysilylpropyl)-O-polyethylene oxide urethane; 2-(4-chlorosulfonylphenyl)-ethyltrichlorosilane and N-(triethoxysilylpropyl)-O-polyethylene oxide urethane; and 2-(4-chlorosulfonylphenyl)-ethyltrichlorosilane and bis-(2-hydroxyethyl)-3-aminopropyltriethoxysilane.

The silane-treated silica filter media have a general formula selected from the group consisting of particle-O—Si(R$^1$)$_x$(R$^2$)$_{3-x}$R$^3$,

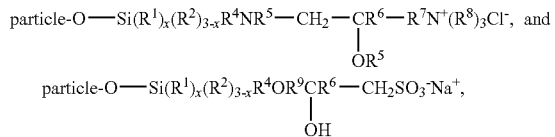

wherein R$^1$, R$^2$, R$^3$, and x are the same as described above so long as there are no more than four groups directly attached to the silicon (Si);

R$^5$, R$^6$, R$^8$ are independently hydrogen, substituted or unsubstituted alkyl, alkenyl, alkaryl, alkcycloalkyl, aryl, cycloalkyl, cycloalkenyl, heteroaryl, heterocyclic, cycloalkaryl, cycloakenylaryl, alkcycloalkaryl, alkcycloalkenyaryl, ether, ester or arylalkaryl;

R$^4$, R$^7$, R$^9$ are substituted or unsubstituted alkyl, alkenyl, alkaryl, alkcycloalkyl, aryl, cycloalkyl, cycloalkenyl, heteroaryl, heterocyclic, cycloalkaryl, cycloakenylaryl, alkcycloalkaryl, alkcycloalkenyaryl, or arylalkaryl radicals capable of forming two covalent attachments.

The silica filter media with surface silanol are treated with silane in a general reaction scheme as following:

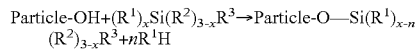

where Particle-OH is a filter particle with reactive sites on surface. For example, R$^1$ is a methoxy (CH$_3$O—) or ethoxy (CH$_3$CH$_2$O—) labile leaving group of the silane, which chemically interacts, with the reactive hydroxyl group on the particle surface or with other reactive hydrolyzed silane molecules which are not attached to the surface. $1 \leq x \leq 3$; n is the number of R$^1$ groups reacted, and $n \leq x$.

Prolonged reaction of excess amounts of reactive silane under anhydrous conditions results in reaction of only 25% to 50% of the total active sites on the porous material since further reaction is inhibited by steric hindrance between the immobilized residues and is also hindered by access to deeply imbedded Particle-OH groups. For the purposes of this invention, such sterically available sites will be designated as the "saturation coverage" and "saturation coverage" depends upon the steric requirements of a particular residue. Note that this designation of "saturation coverage" is applicable to reactive silanes with one or more labile leaving groups. Under anhydrous conditions, such silanes form monolayers and cannot form multiple layers of undefined saturation. However, under aqueous conditions, multiple layers can be built on the surface with multifunctional silanes.

The surface silane treatment of silica filter media can be carried out by an essentially "wet" or essentially "dry" process. The essentially wet process consists of reacting the silane onto the silica filter media in a solvent (organic solvent or water) and optionally using heat. Heat or solvent is not required for the reaction; however, heat or solvent improves the reaction rate and the uniform surface coverage. The essentially dry process consists of reacting the silane onto the silica filter media in a vapor phase or highly stirred liquid phase by directly mixing the silane with silica filter media and subsequently heating.

A preferred method for treating silica filter media with silanes is adding the reacting silanes gradually to a rapidly stirred solvent, which is in direct contact with the porous silica filter media. Another preferred method is to carry out the treatment in the vapor phase by causing the vapor of the reactive silanes to contact and react with the silica filter media. For example, the porous material is placed in a vacuum reactor and dried under vacuum. The rapidly reacting silane is then allowed to enter the vacuum chamber as a vapor and contact the porous material; after a certain contact time, the byproducts of the reaction are removed under reduced pressure. Then the vacuum is released, and the porous material is removed from the chamber.

The actual treatment process can be carried out in a period from 1 minute to 24 hours. Generally, for purposes of this invention, it is preferred to carry out the treatment over a period from about 30 minutes to 6 hours to ensure that the surface of the filter aid material is uniformly treated. The treatments are carried out at temperatures ranging from 0 to 400° C. Preferred treatment temperatures are from room temperature (22 to 28° C.) to 200°.

The amount of reacting silanes used in this invention depends on the number of surface hydroxyls to be reacted, and the molecular weight of the silane. Typically, a stoichiometric amount equivalent to the available surface hydroxyls plus some excess amount of the reacting silane is used to treat the surface hydroxyls because of the potential side reactions. If a thicker exterior surface treatment is desired, then more reacting silane should be used. Typically, 0 to 10 (preferred), 0 to 20, or 1 to 50 times excess is used. However, it is not uncommon to use from 1 to 500 times excess; which results in more treatment on the particle.

Silanes with hydrolysable groups condense with Particle-OH groups of the surface of the particles, and provide covalent coupling of organic groups to these substrates. For example, the alkoxy groups of the silanes chemically react with the Particle-OH groups of the particle surface. The surface-silane interaction is fast and efficient. For example, when silanes having a quaternary ammonium moiety are used, the protonated positively charged silanes electro-statically attract to the deprotonated groups of the particle efficiently to facilitate fast and efficient reaction.

Silane-reacted silica filter media preferably have a functional moiety, which can react with a component of interest. The functional moiety is selected from the group consisting of quaternary ammonium, epoxy, amino, urea, methacrylate, imidazole, sulphonate and other organic moieties known to react with biological molecules. In addition, the functionally moiety can be further reacted, using well-known methods, to create further new functionalities for other interactions. General schemes for preparation of a silane-reacted particle filter media with a functional quaternary ammonium or sulphonate group are illustrated as follows.

Silane-reacted particle filter media with a functional quaternary ammonium group can be prepared in one step. Optionally, a two step or three step process may be employed. For example, in the first step of the two step process, the particle surface is reacted with an amino-functional silane, $(R^1)_x Si(R^2)_{3-x} R^4 N(R^5)_2$, applying the previously described procedure. In the next step, the secondary amine readily reacts with the epoxide group of the glycidyltrimethylammoniumchloride, which is a convenient way to introduce quaternary ammonium functionality. (See Scheme 1)

Scheme 1. Synthesis of quaternary ammonium functional filter aid in two steps.

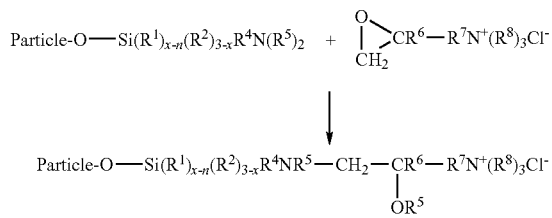

Silane-reacted silica filter media with a functional sulphonate group can be prepared in two steps. In the first step, the particle surface is reacted with an epoxy-functional silane applying the previously described procedure. In the next step, the epoxy functionality readily reacts with sodium bisulfate to produce sulphonate-functional silica filter media. (See Scheme 2). Sodium metabisulfite ($Na_2S_2O_5$) decomposes in water to form sodium bisulfate ($NaHSO_3$).

Scheme 2. Synthesis of sulphonate-functional silica filter media

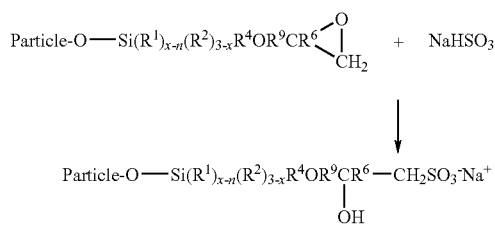

The silane-treated particles are used in separation applications to capture soluble materials through electrostatic, and/or hydrophobic, and/or hydrophilic interaction mechanisms while removing particulates. The advantage of the treated silica filter media is that the separation process is simplified by combining the filtration and solid phase extraction in a single step. The desired quality of the treated silica filter media is to have similar or improved flow rate (filtration properties) to the untreated silica filter media along with the capability to capture soluble materials through sorption in a single operation.

In one embodiment of the invention, specific charged groups are attached covalently to the surface of the silica particles to capture materials electrostatically. The oppositely charged materials are bound to the porous treated surface. In addition to the electrostatic attraction, hydrophobic or hydrophilic ligands are used to improve the binding and/or release characteristics of the silica filter media by hydrophobic or hydrophilic interaction.

Treated silica filter media are characterized by measuring surface area, pore volume and pore size using methods known to the art such as a Micrometrics® analyzer. For example, surface area can be characterized by BET technique. Pore volume and pore diameter can be calculated by Barrett-Joyner-Halenda analysis. Specific functional groups and molecular structure can be determined by NMR spectroscopy. Carbon-hydrogen-nitrogen content can be determined by combustion techniques; from this analysis information, the treatment level on the particle surface can be calculated.

The silane-treated silica filter media useful for the present invention in general (but not limited to) a general formula selected from the group consisting of particle-O—$Si(R^1)_x$ $(R^2)_{3-x}R^3$,

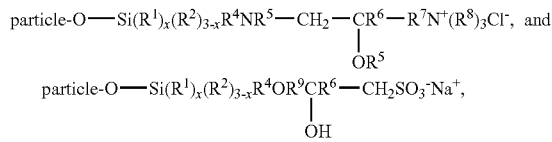

wherein $R^1$ is alkoxy, halogen, hydroxyl, aryloxy, amino, carboxy, cyano, aminoacyl, or acylamino, alkyl ester, or aryl ester;

$R^2$ are independently substituted or unsubstituted alkyl, alkenyl, alkaryl, alkcycloalkyl, aryl, cycloalkyl, cycloalkenyl, heteroaryl, heterocyclic, cycloalkaryl, cycloakenylaryl, alkcycloalkaryl, alkcycloalkenyaryl, or arylalkaryl;

$R^3$ is hydrogen, alkyl, alkenyl, alkaryl, alkcycloalkyl, aryl, cycloalkyl, cycloalkenyl, heteroaryl, heterocyclic, cycloalkaryl, cycloakenylaryl, alkcycloalkaryl, alkcycloalkenyaryl, arylakaryl, arylakaryl, alkoxy, halogen, hydroxyl, aryloxy, amino, alkyl ester, aryl ester, carboxy, sulphonate, cyano, aminoacyl, acylamino, epoxy, phosphonate, isothiouronium, thiouronium, alkylamino, quaternary ammonium, trialkylammonium, alkyl epoxy, alkyl urea, alkyl imidazole, or alkylisothiouronium; wherein the hydrogen of said alkyl, alkenyl, aryl, cycloalkyl, cycloalkenyl, heteroaryl, and heterocyclic is optionally substituted by halogen, hydroxyl, amino, carboxy, or cyano;

$R^5$, $R^6$ and $R^8$ are independently hydrogen, substituted or unsubstituted alkyl, alkenyl, alkaryl, alkcycloalkyl, aryl, cycloalkyl, cycloalkenyl, heteroaryl, heterocyclic, cycloalkaryl, cycloakenylaryl, alkcycloalkaryl, alkcycloalkenyaryl, or arylalkaryl;

$R^4$, $R^7$, $R^9$ are substituted or unsubstituted alkyl, alkenyl, alkaryl, alkcycloalkyl, aryl, cycloalkyl, cycloalkenyl, heteroaryl, heterocyclic, cycloalkaryl, cycloakenylaryl, alkcycloalkaryl, alkcycloalkenyaryl, or arylalkaryl radicals capable of forming two covalent attachments;

wherein said particle is rice hull ash, oat hull ash, diatomaceous earth, perlite, talc, or clay.

The silane-reacted silica filter media of the present method preferably have a functional moiety, which can react with a component of interest. The functional moiety is selected from the group consisting of alkoxyl, quaternary ammonium, epoxy, amino, urea, methacrylate, imidazole, sulphonate, carboxyl, cyano, sulfhydryl, carbonyl, isothiouronium, phosphonate, and other organic moieties known to react with biological molecules.

A beverage sample can be applied to silane-treated silica filter media with or without pre-filtration to remove particulates. It is advantageous of the present invention that no pre-filtration step is required. In addition, a beverage sample can be applied to silane-treated silica filter media with or without pre-mixing the beverage with the filter media prior to the filtration step. In one embodiment, the sample is mixed with the treated silica filter media by any means of mechanical mixing (such as agitation, stirring, vortexing, etc.) for a period of time to allow sufficient binding of the component to the surface of treated silica filter media. Those skilled in the art will recognize that the time suitable for binding is dependent upon the character of the pores of the media, the characteristics of the protein or polyphenol, the viscosity of the beverage, and other known kinetic principles. Generally, the time for binding to occur varies from about a few minutes to a few hours, but may continue up to 1-3 days. After the components bind to the treated silica filter media, the mixture is applied to a filtration device and the sample is subsequently filtered through the filter media.

In another embodiment, a beverage sample can be filtered directly through a filtration unit containing silane-treated silica filter media without pre-mixing the sample with the filter media. The treated silica filter media capture particulates and bind certain soluble components, such as proteins and polyphenols, while allowing the unbound soluble components, such as foam-active protein, to flow through. The filtered beverage sample is collected.

One application of the invention is to use the silane-treated silica filter media to remove microorganisms from a beverage. Microbial contamination is a common problem across the brewing, winery, juice and other beverage industry. Applicants have found that the silane-treated silica filter media of this invention have anti-microbial activity. By contacting bacteria with the silane-treated silica filter media, the total viable bacterial counts are significantly reduced. The microorganisms are also captured by the silane-treated silica filter media. Thus, the filtration step further removes the microbial contamination from the product.

The following examples further illustrate the present invention. These examples are intended merely to be illustrative of the present invention and are not to be construed as being limiting. Examples 1 through 5 illustrate the surface treatment of silica filter media. Examples 6-13 illustrate the antimicrobial activity of the silane-treated silica filter media and the filtration results. Examples 14-19 illustrate the beer treatment with the silane-treated media.

In U.S. Application Publication No. US 2004-0211724 A1, Examples 5 through 14 illustrate the use of the silane treated filter media for separating one or more protein components of interest from a sample containing particulate matter and soluble components. The U.S. Application Publication US 2004-0211724 A1, particularly Examples 5-14, is incorporated herein by reference in its entirety.

EXAMPLES

Example 1

Preparation of Treated Rice Hull Ash Media (tRHA) Using Trialkoxysilanes in a Batch Process The treatment equipment is composed of a 3-neck, round bottom reaction flask, a Teflon shaft mechanic stirrer, thermometer, condenser, and heating mantle around the flask. The reaction flask was loaded with ungrounded RHA silica filter media (surface area: ~30 $m^2/g$), and solvent mixture. Table 1 shows the reaction conditions for each example. The mixture was stirred for a few minutes at ambient temperature, then the surface modification process involved addition of the proper amount of the silane directly to the mixture in a slow addition rate, while good mixing was maintained. 250% of the proper amount of the silane as calculated to achieve multilayer coverage (high-level treatment) or 85% of the amount of silane as calculated to achieve monolayer coverage (low level treatment) was added and the silane quantity was also corrected for their purity. The loading concentrations are also listed in Table 1. Subsequently, the mixture was heated to reflux under $N_2$ blanket, which is used primarily for safety and has no other affect on the outcome of the reaction, although heating is not required. After 2 hours stirring and refluxing, the treated slurry mixture was allowed to cool. Then it was transferred to a porcelain Büchner funnel outfitted with Whatman filter paper, and attached to a vacuum filter flash. The treated filter slurry was filtered and washed twice with toluene and twice with IPA. Afterward, the sample was dried in the hood for about 24 hours. The treated filter media was transferred to a Pyrex container and covered with a paraffin film having a number of holes made with a syringe needle, and then the sample was dried in a vacuum oven at 60° C. for 2-4 hours. The dried samples were analyzed for surface area, pore structure, and carbon-hydrogen-nitrogen content.

TABLE 1

Summary of treatment compositions and conditions

| Sample # | Silica Amount g | Silane Type | Treatment Condition | Silane Purity % | Added Silane g |
|---|---|---|---|---|---|
| 1 | 50 | 3-(trimethoxysilyl)propyloctadecyl-dimethylammonium chloride | $H_2O$, reflux | 42% | 15.06 |
| 2 | 50 | 3-(trimethoxysilyl)propyloctadecyl-dimethylammonium chloride | $H_2O$, room temp. | 42% | 15.06 |
| 3 | 50 | 3-(trimethoxysilyl)propyloctadecyl-dimethylammonium chloride | Toluene, reflux, stochiometric $H_2O$ | 42% | 15.06 |
| 4 | 50 | 3-(trimethoxysilyl)propyloctadecyl-dimethylammonium chloride | Toluene, IPA, reflux | 42% | 15.06 |
| 5 | 50 | 3-(trimethoxysilyl)propyloctadecyl-dimethylammonium chloride | Toluene, IPA, reflux, stochiometric $H_2O$ at end | 42% | 15.06 |
| 6 | 50 | 3-(trimethoxysilyl)propyloctadecyl-dimethylammonium chloride | Toluene, IPA, reflux | 42% | 7.03 |
| 7 | 50 | 3-(trimethoxysilyl)-2-(p,m-chloromethyl)-phenylethane | Toluene, IPA, reflux | 90% | 1.47 |

TABLE 1-continued

Summary of treatment compositions and conditions

| Sample # | Silica Amount g | Silane Type | Treatment Condition | Silane Purity % | Added Silane g |
|---|---|---|---|---|---|
| 8 | 50 | 3-(trimethoxysilyl)-2-(p,m-chloromethyl)-phenylethane | Toluene, IPA, reflux | 90% | 4.33 |
| 9 | 50 | 3-(N-styrylmethyl-2-aminoethylamino)-propyltrimethoxysilane hydrochloride | Toluene, IPA, reflux | 32% | 13.30 |
| 10 | 50 | 3-(N-styrylmethyl-2-aminoethylamino)-propyltrimethoxysilane hydrochloride | Toluene, IPA, reflux | 32% | 4.99 |
| 11 | 50 | N-trimethoxysilylpropyl-N,N,N-trimethylammonium chloride | Toluene, IPA, reflux | 50% | 7.32 |
| 12 | 50 | N-trimethoxysilylpropyl-N,N,N-trimethylammonium chloride | Toluene, IPA, reflux | 50% | 2.49 |
| 13 | 50 | 3-(N-styrylmethyl-2-aminoethylamino)-propyltrimethoxysilane hydrochloride | Toluene, IPA, reflux | 40% | 6.69 |
| 14 | 50 | 3-(N-styrylmethyl-2-aminoethylamino)-propyltrimethoxysilane hydrochloride | Toluene, IPA, reflux | 40% | 19.67 |
| 17 | 100 | 3-aminopropyltrimethoxysilane | Toluene, IPA, reflux | 100% | 7.52 |
| 18 | 100 | 3-aminopropyltrimethoxysilane | Toluene, IPA, reflux | 100% | 2.56 |
| 19 | 100 | N-(2-aminoethyl)-3-aminopropyltrimethoxysilane | Toluene, IPA, reflux | 97% | 9.62 |
| 20 | 100 | N-(2-aminoethyl)-3-aminopropyltrimethoxysilane | Toluene, IPA, reflux | 97% | 3.27 |
| 21 | 50 | Phenyldimethylethoxysilane | Toluene, IPA, reflux | 100% | 1.82 |
| 22 | 50 | Phenyldimethylethoxysilane | Toluene, IPA, reflux | 100% | 0.76 |
| 23 | 50 | 3-(trimethoxysilyl)propyl methacrylate | Toluene, IPA, reflux | 98% | 7.66 |
| 24 | 50 | N-(triethoxysilylpropyl)urea | Toluene, IPA, reflux | 49% | 5.44 |
| 25 | 50 | Trimethoxysilylpropyldiethylenetriamine | Toluene, IPA, reflux | 98% | 2.73 |
| 26 | 50 | Bis(2-hydroxyethyl)-3-aminopropyltriethoxysilane | Toluene, IPA, reflux | 58% | 4.96 |
| 27 | 50 | N-[3-(triethoxysilyl)propyl]imidazole | Toluene, IPA, reflux | 96% | 2.88 |

Treatments are done on low carbon, ungrounded RHA from Producers.

Example 2

Preparation of Different Types of Treated Silica Filter Media

Additional substrates, namely high carbon rice hull ash, different types of ultra pure diatomaceous earth (Celpure P1000, Celpure P65), Celite 545 (standard diatomaceous earth filter aid), Perlite, and LRA II (a non-silica based lipid adsorbent) were used. Table 2 summarizes the treatment conditions and compositions of these samples.

TABLE 2

Compositions and conditions of treatments of different substrates

| Sample # | Substrate Media Type | Silica Amount g | Treatment Type | Treatment Condition | Silane Purity % | Loading (X Monolayer coverage) | Added Silane g |
|---|---|---|---|---|---|---|---|
| 28 | AgriSilicas STD | 150 | AEAPTMS (A 0700) | Toluene, IPA, reflux | 97% | 150% | 10.53 |
| 29 | Celpure P1000 | 100 | AEAPTMS (A 0700) | Toluene, IPA, reflux | 97% | 180% | 0.51 |
| 30 | Celpure P1000 | 50 | AEAPTMS (A 0700) | Toluene, IPA, reflux | 97% | 1070% | 1.53 |
| 31 | Celpure P1000 | 50 | Z-6032 (SMAEAPTMS) | Toluene, IPA, reflux | 32% | 200% | 1.46 |
| 32 | Perlite | 50 | AEAPTMS (A 0700) | Toluene, IPA, reflux | 97% | 200% | 0.24 |
| 33 | Perlite | 50 | Z-6032 (SMAEAPTMS) | Toluene, IPA, reflux | 32% | 200% | 1.21 |
| 34 | Celite 545 | 50 | AEAPTMS (A 0700) | Toluene, IPA, reflux | 97% | 200% | 0.40 |
| 35 | Celite 545 | 50 | Z-6032 (SMAEAPTMS) | Toluene, IPA, reflux | 32% | 200% | 2.05 |
| 36 | Celpure P65 | 50 | AEAPTMS (A 0700) | Toluene, IPA, reflux | 97% | 200% | 0.61 |
| 37 | Celpure P65 | 50 | Z-6032 (SMAEAPTMS) | Toluene, IPA, reflux | 32% | 200% | 3.13 |

TABLE 2-continued

Compositions and conditions of treatments of different substrates

| Sample # | Substrate Media Type | Silica Amount g | Treatment Type | Treatment Condition | Silane Purity % | Loading (X Monolayer coverage) | Added Silane g |
|---|---|---|---|---|---|---|---|
| 38 | LRA 11 | 50 | AEAPTMS (A 0700) | Toluene, IPA, reflux | 97% | 120% | 8.96 |
| 39 | LRA 11 | 50 | Z-6032 (SMAEAPTMS) | Toluene, IPA, reflux | 32% | 120% | 45.80 |

Z-6032: 3-(N-styrylmethyl-2-aminoethylamino)-propyltrimethoxysilane hydrochloride
AEAPTMS: N-(2-aminoethyl)-3-aminopropyltrimethoxysilane Example 3

Two-Step Process to Synthesize Hydrophilic Quaternary Ammonium Functional Filter Aids (Filter Media Samples 40 and 42)

The treatment equipment was composed of a 500 milliliter, 3-neck round bottom reaction flask, a Teflon shaft mechanic stirrer, thermometer, condenser, and heating mantle around the flask. The reaction flask was loaded with 50 g of amino-functional pretreated RHA (sample 17 or 19) silica filter media, and 200 ml IPA solvent. The mixture was stirred for few minutes at ambient temperature, then the surface modification process involved addition of the proper amount of glycidyltrimethylammonium chloride (2.46 g for sample 17, or 2.02 g for sample 19) directly to the mixture in a slow addition rate, while good mixing was maintained. The reaction mixture was heated and refluxed under a $N_2$ blanket. After 4 hours stirring and refluxing, the treated slurry mixture was allowed to cool. Then it was transferred to a porcelain Büchner funnel outfitted with Whatman filter paper, and attached to a vacuum filter flask. The treated filter cake was filtered and washed four times with about 150 ml of DI water each time. Afterward, the sample was dried in the hood for 200 ml IPA:$H_2O$ (5:1) solvent. The mixture was stirred for few minutes at ambient temperature, and the reaction mixture heated up to 70° C. under a $N_2$ blanket. The surface modification process involved addition of the mixture of 0.55 g of sodium metabisulfite, 0.07 g of sodium sulfite catalyst, and 5 g water from an additional funnel directly to the mixture in a slow addition rate over 1-2 hours, while good mixing was maintained. The temperature was then raised up to approximately 80° C., until the reaction completed. The reaction was monitored by iodometric titration of residual $NaHSO_3$. After approximately 22 hours stirring and refluxing, the treated slurry mixture was allowed to cool. Then it was transferred to a porcelain Büchner funnel outfitted with Whatman filter paper, and attached to a vacuum filter flask. The treated filter cake was filtered and washed four times with about 150 ml of DI water each time. Afterward, the sample was dried in the hood for about 24 hours. Next the treated filter aid was transferred to a Pyrex container and covered with a paraffin film having a number of holes made with a syringe needle, and then the sample was vacuum oven dried at 60° C. for 2-4 hours. The dried samples were analyzed for surface area, pores structure, carbon-hydrogen-nitrogen content, $^{29}Si$ NMR. Table 3 summarizes compositions and conditions of the two-step processes.

TABLE 3

Compositions and conditions of treatments of two step processes.

| Sample # | Silica Amount g | 2nd Step Reactant | Treatment Condition | Silane Purity % | Added Silane g |
|---|---|---|---|---|---|
| 40 | 50 | Glycidyltrimethylammonium chloride | IPA, reflux | 75% | 2.02 |
| 41 | 50 | $Na_2S_2O_5/Na_2SO_3$ | IPA, water, reflux | 100% | 0.55/0.07 |
| 42 | 50 | Glycidyltrimethylammonium chloride | IPA, reflux | 75% | 2.46 | about 24 hours. Next the treated silica filter media was transferred to a Pyrex container and covered with a paraffin film having a number of holes made with a syringe needle, and then the sample was vacuum oven dried at 60° C. for 2-4 hours. The dried samples were analyzed for surface area, pores structure, carbon-hydrogen-nitrogen content, $^{29}Si$ NMR.

Example 4

Two-Step Process to Synthesize Hydrophilic Sulphonate-Functional Filter Aids (Filter Media Sample 41)

The treatment equipment was composed of a 500 milliliter, 3-neck round bottom reaction flask, a Teflon shaft mechanic stirrer, thermometer, condenser, and heating mantle around the flask. The reaction flask was loaded with 50 g of epoxy-functional pretreated RHA silica filter media (sample 15), and Characterization of the Treated Silica Filter Media: BET Surface Area, Pore Volume, Pore Diameter The surface area and porosity were measured using a Micrometrics® ASAP 2010 analyzer. Before analyses, the samples were degassed under vacuum at 150° C. until a constant pressure was achieved. In the analysis step, $N_2$ gas was adsorbed by the sample at 77° K. and the surface area was calculated from the volume of adsorbate. BET parameters were acquired by integration of the BET equation using ASAP-2010 software. Surface area was calculated in the range of $0.05 \leq P/Po \leq 50.3$ from the adsorption branch of the isotherm. Barrett-Joyner-Halenda analysis was used to calculate the pore volume and pore diameter.

NMR

Identification of specific functional groups and molecular structure was determined by $^{29}Si$ solid state NMR spectroscopy on a Unity Plus 400 MHz Spectrometer using a Varian VT CPMAS probe and a 7 mm motor.

Carbon-Hydrogen-Nitrogen (CHN)

CHN content was determined by combustion technique at Robertson Microlit Laboratories. From this analysis information, the treatment level on the surface was calculated.

Table 4 summarizes the characterization data of the treated silica samples.

TABLE 4

Characterization data summary of treated silica samples

| Sample # | Moisture content % | Surface Area $m^2/g$ | Pore Volume $cm^3/g$ | Pore Diameter Å | % C by Robertson Microlit | Ligand density $\mu mol/m^2$ | $\mu mol/g$ |
|---|---|---|---|---|---|---|---|
| 1 | 2.63% | 8.69 | 0.047 | 149.54 | 5.69% | 23.73 | 206.16 |
| 2 | 4.43% | 11.58 | 0.060 | 142.22 | 5.58% | 17.47 | 202.17 |
| 3 | 2.05% | 17.85 | 0.077 | 98.42 | 5.12% | 10.39 | 185.51 |
| 4 | 1.60% | 22.51 | 0.097 | 97.05 | 3.11% | 4.61 | 103.67 |
| 5 | 1.43% | 23.45 | 0.098 | 93.15 | 2.96% | 4.57 | 107.25 |
| 6 | 1.89% | 24.53 | 0.104 | 94.57 | 2.47% | 3.36 | 82.33 |
| 7 | 1.57% | 32.65 | 0.128 | 99.68 | 0.84% | 1.95 | 63.64 |
| 8 | 2.60% | 33.66 | 0.129 | 99.64 | 1.01% | 2.27 | 76.52 |
| 9 | 2.20% | 22.98 | 0.101 | 105.56 | 2.19% | 4.96 | 114.06 |
| 10 | 1.46% | 29.32 | 0.118 | 96.80 | 1.32% | 2.35 | 68.75 |
| 11 | 1.33% | 30.24 | 0.124 | 100.45 | 1.67% | 5.75 | 173.96 |
| 12 | 1.44% | 22.39 | 0.103 | 112.07 | 0.88% | 4.09 | 91.67 |
| 13 | 1.59% | 28.19 | 0.112 | 95.47 | 2.09% | 3.86 | 108.85 |
| 14 | 1.77% | 18.76 | 0.077 | 101.39 | 2.98% | 8.27 | 155.21 |
| 17 | 2.71% | 28.02 | 0.100 | 97.28 | 1.36% | 8.09 | 226.67 |
| 18 | 0.86% | 30.48 | 0.118 | 100.00 | 0.72% | 3.94 | 120.00 |
| 19 | 1.49% | 23.64 | 0.101 | 101.93 | 1.68% | 8.46 | 200.00 |
| 20 | 1.75% | 28.15 | 0.118 | 98.55 | 1.03% | 4.36 | 122.62 |
| 21 | 1.44% | 32.32 | 0.131 | 102.99 | 0.42% | 1.35 | 43.75 |
| 22 | 2.47% | 32.28 | 0.133 | 104.50 | 0.23% | 0.74 | 23.96 |
| 23 | 0.80% | 29.80 | 0.120 | 97.08 | 0.98% | 3.04 | 90.74 |
| 24 | 1.05% | 28.99 | 0.119 | 100.14 | 0.80% | 2.87 | 83.33 |
| 25 | 2.06% | 27.02 | 0.117 | 100.15 | 1.14% | 3.91 | 105.56 |
| 26 | 0.96% | 31.75 | 0.128 | 100.93 | 0.74% | 1.77 | 56.06 |
| 27 | 1.63% | 31.06 | 0.129 | 102.94 | 0.62% | 1.66 | 51.67 |
| 28 | 2.90% | 16.11 | 0.023 | 215.71 | 0.82% | 6.06 | 97.62 |
| 29 | 0.33% | 2.18 | 0.002 | 106.61 | 0.09% | 4.92 | 10.71 |
| 31 | 0.04% | 2.39 | 0.003 | 140.36 | 0.46% | 10.02 | 23.96 |
| 33 | 5.68% | 3.07 | 0.003 | 148.64 | 0.57% | 9.66 | 29.69 |
| 34 | 0.48% | 1.47 | 0.002 | 104.07 | 0.16% | 12.94 | 19.05 |
| 35 | 0.05% | 2.11 | 0.002 | 139.39 | 0.22% | 5.42 | 11.46 |
| 37 | 0.94% | 5.66 | 0.014 | 145.31 | 0.39% | 3.59 | 20.31 |
| 39 | 5.31% | 112.73 | 0.741 | 222.48 | 8.71% | 4.02 | 453.65 |
| 40 | 2.77% | 21.82 | 0.099 | 105.43 | 1.82% | 5.35 | 116.67 |
| 41 | 2.69% | 29.02 | 0.114 | 98.12 | 0.99% | 3.55 | 103.13 |
| 42 | 1.91% | 26.17 | 0.109 | 102.99 | 1.41% | 4.08 | 106.82 |

Example 5

Compositions and Treatment Conditions of Silica Filters and their Characterization Table 5A-5D summarized additional compositions and treatment conditions of rice hull ash and their characterization.

TABLE 5A

| Filter Media Sample No | Treatment Type | Silica Type | Silica gram | First Additive Name | Gram | Second Additive Name | Gram | Reagent gram Glycidyl-trimethyl-ammonium chloride | % C % | Ligand Density µmol/m² |
|---|---|---|---|---|---|---|---|---|---|---|
| 43 | 3-(N-styrylmethyl-2-aminoethylamino)-propyltrimethoxy-silane hydrochloride | Producers RHA | 25 | 3-(N-styrylmethyl-2-aminoethylamino)-propyltrimethoxy-silane hydrochloride | 19.83 | | | | 5.61% | 25.68 |
| 44 | 3-(Trimethoxysilyl-propyl)isothiouronium chloride | Producers RHA | 25 | 3-(Trimethoxysilyl-propyl)isothiouronium chloride | 3.88 | | | | 1.06% | 11.34 |
| 45 | 3-(Trimethoxysilyl-propyl)isothiouronium chloride | Producers RHA | 25 | 3-(Trimethoxysilyl-propyl)isothiouronium chloride | 3.88 | | | | 1.67% | 18.27 |
| 46 | N-Octadecyldimethyl(3-Trimethoxysilyl-propyl)ammonium chloride, then N-(Triethoxysilyl-propyl)-o-polyethylene oxide urethane | RiceSil 100 | 500 | N-Octadecyldimethyl(3-Trimethoxysilyl-propyl)ammonium chloride | 93.29 | N-(Triethoxysilyl-propyl)-o-polyethylene oxide urethane | 4.12 | | 2.46% | 5.41 |
| 47 | 3-(N-styrylmethyl-2-aminoethylamino)-propyltrimethoxysilane hydrochloride, then N-(Triethoxysilylpropyl)-o-polyethylene oxide urethane | RiceSil 100 | 500 | 3-(N-styrylmethyl-2-aminoethylamino)-propyltrimethoxysilane hydrochloride | 92.66 | N-(Triethoxysilyl-propyl)-o-polyethylene oxide urethane | 3.12 | | 1.96% | 6.37 |
| 48 | 3-(N-styrylmethyl-2-aminoethylamino)-propyltrimethoxy-silane hydrochloride | RiceSil 100 | 500 | 3-(N-styrylmethyl-2-aminoethylamino)-propyltrimethoxy-silane hydrochloride | 185.33 | | | | 4.16% | 40.42 |
| 49 | 3-(Trimethoxysilylpropyl)-isothiouronium chloride | RiceSil 100 | 25 | 3-(Trimethoxysilyl-propyl)isothiouronium chloride | 3.88 | | | | 1.90% | 24.60 |
| 50 | N-(2-Aminoethyl)-3-amino-propyltrimethoxysilane, then Glycidyltrimethyl-ammonium chloride | RiceSil 100 | 500 | N-(2-Aminoethyl)-3-aminopropyl-trimethoxysilane | 43.42 | | | 23.47 | 2.53% | 16.35 |
| 51 | 3-(Trihydroxysilylpropyl-methyl-phosphonate)sodium salt | RiceSil 100 | 200 | 3-(Trihydroxysilylpropyl-methyl-phosphonate)sodium salt | 21.53 | | | | 1.00% | 6.75 |
| 52 | N-Octadecyldimethyl(3-Trimethoxysilylpropyl)-ammonium chloride | RiceSil 100 | 500 | N-Octadecyldimethyl(3-Trimethoxysilylpropyl)-ammonium chloride | 9.33 | | | | 0.68% | 0.90 |
| 53 | N-(Trimethoxysilyl-propyl)ethylenediamine, triacetic acid, trisodium salt | RiceSil 100 | 500 | N-(Trimethoxysilyl-propyl)ethylenediamine, triacetic acid, trisodium salt | 5.80 | | | | 1.50% | 12.53 |

TABLE 5B

| Sample # | Silica g | Silane Type | Treatment condition | Silane Purity % | Added Silane g | % C | Ligand Density |
|---|---|---|---|---|---|---|---|
| 54 | 500 | trimethoxysilylpropyl-ethylenediamine, triacetic acid, trisodium salt | Toluene, Reflux, $H_2O$ | 45.0 | 72.46 | 1.86 | 4.79 |
| 55 | 500 | N-(triethoxysilylpropyl)-O-polyethylene oxide urethane | Toluene, Reflux, $H_2O$ | 95.0 | 59.68 | 2.34 | 4.39 |
| 56 | 500 | Bis-(2-hydroxyethyl)-3-aminopropyltriethoxysilane | Toluene, Reflux, $H_2O$ | 57.6 | 22.55 | 0.93 | 1.26 |
| 57 | 500 | ((chloromethyl)phenylethyl)trimethoxy silane | Toluene, Reflux, $H_2O$ | 90.0 | 8.70 | 1.05 | 1.55 |
| 58 | 500 | N-(3-triethoxysilylpropyl)-gluconamide | Toluene, Reflux, $H_2O$ | 50.0 | 31.64 | 1.12 | 2.1 |
| 59 | 500 | 3-mercaptopropyltriethoxysilane | Toluene, Reflux, $H_2O$ | 95.0 | 9.95 | 0.81 | 3.59 |
| 60 | 500 | N-(triethoxysilylpropyl)-4-hydroxybutyramide | Toluene, Reflux, $H_2O$ | 100.0 | 12.16 | 1.16 | 0.21 |
| 61 | 500 | 3-(triethoxysilyl)propylsuccinic anhydride | Toluene, Reflux, $H_2O$ | 95.0 | 12.73 | 0.76 | 1.46 |
| 62 | 500 | Tris(3-trimethoxysilylpropyl)isocyanurate | Toluene, Reflux, $H_2O$ | 95.0 | 34.18 | 1.28 | 2.13 |
| 63 | 500 | 2-Hydroxy-4-(3-triethoxysilylpropoxy)-diphenylketone | Toluene, Reflux, $H_2O$ | 95.0 | 23.23 | 1.61 | 1.74 |
| 64 | 500 | Ureidopropyltrimethoxysilane | Toluene, Reflux, $H_2O$ | 100.0 | 11.72 | 0.86 | 2.03 |
| 65 | 500 | 3-isocyanatopropyltriethoxysilane | Toluene, Reflux, $H_2O$ | 95.0 | 6.90 | 0.81 | 5.31 |
| 66 | 500 | N-(3-trimethoxysilylpropyl)pyrrole | Toluene, Reflux, $H_2O$ | 100.0 | 6.08 | 0.87 | 3.26 |
| 67 | 500 | Bis[(3-methyldimethoxysilyl)propyl]-polypropylene oxide | Toluene, Reflux, $H_2O$ | 100.0 | 18.92 | 1.72 | 1.4 |

TABLE 5C

| Sample # | Silane Type | Treatment condition | RiceSil 100 Weight gram | Silane Purity % | Silane Weight gram | % C Roberts on Microlit | Ligand Density Calculated $umol/m^2$ |
|---|---|---|---|---|---|---|---|
| 68 | trimethoxysilylpropyl-ethylenediamine, triacetic acid, trisodium salt | Toluene, Reflux, $H_2O$ | 500 | 45% | 24.20 | 1.08 | 1.27 |
| 69 | N-trimethoxysilylpropyl-N,N,N—Cl, trimethylammonium chloride | Toluene, Reflux, $H_2O$ | 500 | 50% | 14.60 | 0.79 | 1.28 |
| 70 | 2-(4-chlorosulfonylphenyl)-ethyltrichlorosilane | Toluene, Reflux, $H_2O$ | 500 | 50% | 24.20 | 1.28 | 2.89 |
| 71 | 3-(N-styrylmethyl-2-aminoethylamino)-propyltrimethoxysilane hydrochloride | Toluene, Reflux, $H_2O$ | 500 | 32% | 46.30 | 1.65 | 4.69 |
| 72 | triethoxysilylpropylethyl-carbamate | Toluene, Reflux, $H_2O$ | 500 | 100% | 12.35 | 1.01 | 1.60 |
| 73 | N-(triethoxysilylpropyl)-O-polyethylene oxide urethane | Toluene, Reflux, $H_2O$ | 500 | 95% | 19.94 | 1.09 | 1.01 |
| 74 | 3-trihydrosilylpropylmethylphosphonate, sodium salt | Toluene, Reflux, $H_2O$ | 500 | 42% | 22.45 | 0.83 | 2.82 |
| 75 | Bis-(2-hydroxyethyl)-3-aminopropyltriethoxysilane | Toluene, Reflux, $H_2O$ | 500 | 58% | 22.55 | 0.93 | 1.26 |
| 76 | N-(3-triethoxysilylpropyl)-4,5-dihydroimidazole | Toluene, Reflux, $H_2O$ | 500 | 96% | 12.06 | 1 | 1.57 |
| 77 | ((chloromethyl)phenylethyl)trimethoxysilane | Toluene, Reflux, $H_2O$ | 500 | 90% | 8.70 | 1.05 | 1.55 |
| 78 | 3-aminopropyltrimethoxysilane, then | Toluene, Reflux, $H_2O$ | 500 | 81% | 8.15 | 0.99 | 2.58 |
|  | N-(triethoxysilylpropyl)-O-polyethylene oxide urethane |  |  | 95% | 5.03 |  |  |
| 79 | 3-trihydrosilylpropylmethylphosphonate, sodium salt, then | Toluene, Reflux, $H_2O$ | 500 | 42% | 16.87 | 0.77 | 2.43 |
|  | N-(triethoxysilylpropyl)-O-polyethylene oxide urethane |  |  | 95% | 5.02 |  |  |
| 80 | N-trimethoxysilylpropyl-N,N,N—Cl, trimethylammonium chloride, then | Toluene, Reflux, $H_2O$ | 500 | 50% | 15.30 | 0.95 | 2.41 |
|  | (3-glycidoxypropyl)trimethoxysilane |  |  | 100% | 2.40 |  |  |

TABLE 5C-continued

| Sample # | Silane Type | Treatment condition | RiceSil 100 Weight gram | Silane Purity % | Silane Weight gram | % C Roberts on Microlit | Ligand Density Calculated umol/m$^2$ |
|---|---|---|---|---|---|---|---|
| 81 | 3-trihydrosilylpropylmethylphosphonate, sodium salt, then | Toluene, Reflux, H$_2$O | 500 | 42% | 16.90 | 0.98 | 3.81 |
|  | Bis-(2-hydroxyethyl)-3-aminopropyltriethoxysilane |  |  | 58% | 5.31 |  |  |
| 82 | 3-(N-styrylmethyl-2-aminoethylamino)-propyltrimethoxysilane hydrochloride, then | Toluene, Reflux, H$_2$O | 500 | 32% | 34.76 | 1.72 | 4.95 |
|  | N-(triethoxysilylpropyl)-O-polyethylene oxide urethane |  |  | 95% | 5.04 |  |  |
| 83 | 2-(trimethoxysilylethyl)pyridine | Toluene, Reflux, H$_2$O | 500 | 100% | 9.01 | 1.17 | 2.89 |
| 84 | N-(3-triethoxysilylpropyl)-gluconamide | Toluene, Reflux, H$_2$O | 500 | 50% | 31.64 | 1.12 | 2.10 |
| 85 | 2-(trimethoxysilylethyl)pyridine, then | Toluene, Reflux, H$_2$O | 500 | 100% | 6.74 | 1.04 | 2.40 |
|  | N-(3-triethoxysilylpropyl)-gluconamide |  |  | 50% | 7.90 |  |  |
| 86 | 3-mercaptopropyltriethoxysilane | Toluene, Reflux, H$_2$O | 500 | 95% | 9.95 | 0.81 | 3.59 |
| 87 | N-trimethoxysilylpropyl-N,N,N—Cl, trimethylammonium chloride, then | Toluene, Reflux, H$_2$O | 500 | 50% | 15.30 | 0.98 | 2.54 |
|  | N-(3-triethoxysilylpropyl)-gluconamide |  |  | 50% | 7.95 |  |  |
| 88 | N-(triethoxysilylpropyl)-4-hydroxybutyramide | Toluene, Reflux, H$_2$O | 500 | 100% | 12.16 | 1.16 | 0.21 |
| 89 | 3-(triethoxysilyl)propylsuccinic anhydride | Toluene, Reflux, H$_2$O | 500 | 95% | 12.73 | 0.78 | 1.42 |
| 90 | Trimethoxysilylpropyl polyethyleneimine | Toluene, Reflux, H$_2$O | 50 | 50% | 1.00 | 1.04 | 1.43 |
| 91 | Tris(3-trimethoxysilylpropyl)isocyanurate | Toluene, Reflux, H$_2$O | 500 | 95% | 34.18 | 1.28 | 1.60 |
| 92 | 2-Hydroxy-4-(3-triethoxysilylpropoxy)-diphenylketone | Toluene, Reflux, H$_2$O | 500 | 95% | 23.23 | 1.61 | 1.74 |
| 93 | Ureidopropyltrimethoxysilane | Toluene, Reflux, H$_2$O | 500 | 100% | 11.72 | 0.86 | 2.03 |
| 94 | O-(propargyloxy)-N-(triethoxysilylpropyl)urethane | Toluene, Reflux, H$_2$O | 500 | 90% | 17.77 | 1.04 | 1.84 |
| 95 | 3-(trimethoxysilyl)propyloctadecyldimethylammonium chloride | Toluene, Reflux, H$_2$O | 500 | 42% | 9.33 | 0.21 | 0.24 |
| 96 | N-1-phenylethyl-N'-triethoxysilylpropylurea | Toluene, Reflux, H$_2$O | 500 | 100% | 9.70 | 1.02 | 2.43 |
| 97 | 3-isocyanatopropyltriethoxysilane | Toluene, Reflux, H$_2$O | 500 | 95% | 6.90 | 0.81 | 5.31 |
| 98 | 2-(3,4-epoxycyclohexyl)ethyltrimethoxysilane | Toluene, Reflux, H$_2$O | 500 | 97% | 6.90 | 0.98 | 3.22 |
| 99 | N-(3-trimethoxysilylpropyl)pyrrole | Toluene, Reflux, H$_2$O | 500 | 100% | 6.08 | 0.87 | 3.26 |
| 100 | Bis[(3-methyldimethoxysilyl)propyl]-polypropylene oxide | Toluene, Reflux, H$_2$O | 500 | 100% | 18.96 | 1.07 | 1.40 |
| 101 | N-trimethoxysilylpropyl-N,N,N—Cl, trimethylammonium chloride, then | Toluene, Reflux, H$_2$O | 500 | 50% | 10.34 | 0.84 | 3.67 |
|  | 2-Hydroxy-4-(3-triethoxysilylpropoxy)-diphenylketone |  |  | 95% | 3.12 |  |  |
| 102 | Trimethoxysilylpropylisothiouronium chloride | Toluene, Reflux, H$_2$O | 500 | 43% | 15.55 | 0.71 | 0.44 |
| 103 | (3-glycidoxypropyl)trimethoxysilane | Toluene, Reflux, H$_2$O | 500 | 100% | 6.23 | 0.74 | 0.35 |
| 104 | 3-mercaptopropyltriethoxysilane, then | Toluene, Reflux, H$_2$O | 500 | 95% | 4.98 | 0.79 | 1.14 |
|  | N-(triethoxysilylpropyl)-O-polyethylene oxide urethane |  |  | 95% | 3.38 |  |  |
| 105 | 3-(triethoxysilyl)propylsuccinic anhydride, then | Toluene, Reflux, H$_2$O | 500 | 95% | 6.36 | 0.94 | 1.05 |
|  | N-(triethoxysilylpropyl)-O-polyethylene oxide urethane |  |  | 95% | 3.40 |  |  |
| 106 | trimethoxysilylpropyl-ethylenediamine, triacetic acid, trisodium salt, then | Toluene, Reflux, H$_2$O | 500 | 45% | 20.35 | 1.16 | 1.64 |

TABLE 5C-continued

| Sample # | Silane Type | Treatment condition | RiceSil 100 Weight gram | Silane Purity % | Silane Weight gram | % C Roberts on Microlit | Ligand Density Calculated umol/m² |
|---|---|---|---|---|---|---|---|
|  | N-(triethoxysilylpropyl)-O-polyethylene oxide urethane |  |  | 95% | 3.45 |  |  |
| 107 | 2-(4-chlorosulfonylphenyl)-ethyltrichlorosilane, then | Toluene, Reflux, H₂O | 500 | 50% | 13.40 | 0.93 | 0.89 |
|  | N-(triethoxysilylpropyl)-O-polyethylene oxide urethane |  |  | 95% | 3.40 |  |  |
| 108 | 2-(4-chlorosulfonylphenyl)-ethyltrichlorosilane, then | Toluene, Reflux, H₂O | 500 | 50% | 15.30 | 1.01 | 1.15 |
|  | Bis-(2-hydroxyethyl)-3-aminopropyltriethoxysilane |  |  | 58% | 5.32 |  |  |

TABLE 5D

| Sample # | Silane Treatment | Gram Silica | Gram Silane | Purity Silane | % C on Treated Silica | Ligand Density μmol/m2 | Treatment Conditions |
|---|---|---|---|---|---|---|---|
| 109 | 75% N-trimethoxysilylpropyl-N,N,N-trimethylammonium chloride + 25% Bis(2-hydroxyethyl)-3-aminopropyltriethoxysilane. | 500 | 15.29 first agent, 6.12 second agent | 50% first agent, 58% second agent | 1.01 | 4.01 | Toluene, Reflux, H₂O |
| 110 | n-Octadecyltriethoxysilane | 500 | 10.99 | 100% | 0.86% | 3.41 | Toluene, Reflux, H2O |
| 111 | n-Octyltriethoxysilane | 500 | 7.29 | 100% | 0.69% | 2.74 | Toluene, Reflux, H2O |
| 112 | Phenyltriethoxysilane | 500 | 6.34 | 100% | 0.41% | 1.65 | Toluene, Reflux, H2O |

Ligand densities are corrected for 0.43% C due to residual carbon on the original rice hull ash. Mixed silanes sample ligand density are based on first silane.

Example 6

Test of Antimicrobial Activity (*Bacillus subtilis*)

Microorganism tested: *Bacillus subtilis*
Filter media tested: filter media samples 43, 44, 4 and FW12 (untreated diatomaceous earth)
Protocol:
  *Bacillus subtilis* fermentation broth was diluted in sterile PBS to ~$10^4$ CFU/mL (1 OD≈$5*10^8$ CFU/mL was used to estimate CFU/mL in fermentation broth)
  Use 0.5 g filter media/5 mL liquid (10% solid)
1. Serial dilutions (made in sterile 0.9% w/v NaCl) of the diluted broth sample were plated on LA plates to determine actual CFU/mL used. Plates were incubated over night at 34° C.
2. Filter media and diluted bacterial sample (or PBS control) were mixed in a sterile 125 mL baffled flask for 2 hours at 30° C., 200 rpm.
3. Liquid part of the treated samples (2) were plated on LA plates (5 plates for each sample, one plate for control) and incubated overnight at 34° C.
4. The plates were counted for bacteria.
Results:
  The results are summarized in Table 6. By mixing the bacteria with filter media samples 4 and 44, the CFUs were reduced, which indicates that filter media samples 4 and 44 had anti-microbial activity and killed the bacteria by contacting.

TABLE 6

| Sample | CFU/mL |
|---|---|
| Diluted broth - start | $6.53 * 10^3 \pm 2.47 * 10^3$ |
| Sample 43 + bacteria - mixing | $1.04 * 10^4 \pm 1.50 * 10^3$ |
| Sample 44 + bacteria - mixing | $1.30 * 10^2 \pm 3.00 * 10^1$ |
| Sample 4 + bacteria - mixing | TFTC |
| FW12 + bacteria - mixing | $5.90 * 10^4 \pm 8.00 * 10^3$ |
| Diluted broth sample - mixing | $1.05 * 10^3 \pm 5.00 * 10^1$ |

Notes and Abbreviations:
  PBS: Phosphate buffered saline (prevents cells from lysing due to osmotic chock)
  CFU: colony forming units (a measure of viable cells)
  TFTC: Too Few To Count
  The CFU/mL are reported as: Average±Difference (number of plates) [the difference is between the average and the observations farthest from the average].
  Only plates with between 20-300 colonies were counted.

Example 7

Test of Antimicrobial Activity (*Bacillus subtilis*)

Microorganism tested: *Bacillus subtilis*
Filter Media tested: filter media samples 1, 4, 6, 44, and 45.
Protocol:
  *Bacillus subtilis* fermentation broth was diluted in sterile PBS to ~$10^4$ CFU/mL.
  0.5 g filter media/5 mL liquid (10% solid) was used.

1. Serial dilutions (made in sterile 0.9% w/v NaCl) of the diluted broth sample were plated on LA plates to determine actual CFU/mL used. Plates were incubated over night at 34° C.
2. Filter media and diluted bacterial sample (15 mL liquid) were mixed in a sterile 250 mL baffled flask. 2 flasks were used for each filter media.
   (A flask with PBS instead of bacterial sample was included for the following filter media: Samples 1, 6 and 45)
3. The above was mixed for 2 hours at 30° C., 250 rpm.
4. Treated samples (the liquid part) were plated on LA plates (4 or 5 plates for each sample). Plates were incubated overnight at 34° C.
5. The plates were counted for bacteria.

Results:

The results are summarized in Table 7. By mixing the bacteria with filter media samples 1, 4, 6, 44, and 45, the CFUs were significantly reduced.

TABLE 7

| Sample | | CFU/mL |
|---|---|---|
| Diluted broth - start | | $3.45 * 10^4 \pm 4.50 * 10^3$ |
| Diluted broth - mixing | | $1.72 * 10^4 \pm 1.55 * 10^3$ |
| Sample 1 | A | TFTC |
|  | B | TFTC |
| Sample 4 | A | TFTC |
|  | B | TFTC |
| Sample 6 | A | TFTC |
|  | B | $1.00 * 10^2 \pm 0.00 * 10^0$ |
| Sample 44 | A | $3.10 * 10^2 \pm 9.00 * 10^1$ |
|  | B | $6.00 * 10^2$ |
| Sample 45 | A | TFTC |
|  | B | TFTC |

Example 8

Test of Antimicrobial Activity and Filtration (*Lactobacillus brevis*)

Microorganism tested: *Lactobacillus brevis*
Filter media tested: Samples 4, 43, 45 & FW12.
Used 0.5 g filter media/5 mL culture (10% solid).
Protocol:
1. A *Lactobacillus* brevis overnight culture was diluted to ~$10^5$ CFU/mL (based on 1 $OD_{600} \approx 2.7*10^8$ CFU/mL) in two steps—the first dilution was made in sterile *Lactobacillus* MRS broth, the second in sterile PBS.
2. Serial dilutions (in 0.9% w/v NaCl) of the culture were made (second dilution).
3. Diluted samples were plated on *Lactobacillus* MRS broth plates, to determine actual starting CFU/mL.
4. Filter media and diluted bacterial sample (10 mL liquid) were mixed in a sterile 125 mL baffled flask, sealed with Parafilm®, for 2 hours 15 minutes at room temperature on an orbit shaker (~60 rpm).
5. Serial dilutions (in 0.9% w/v NaCl) were made of treated sample and plated on *Lactobacillus* MRS broth plates.
6. Selected samples/dilutions of samples 4, 43 and 45 were filtered through a 5 μm filter.
7. The filtered samples were plated on *Lactobacillus* brevis broth plates, and incubated in a candle jar at 30° C. for 2 days.
8. The plates were counted.

Results:

The results are summarized in Table 15. CFUs were reduced by mixing Samples 4, 43, and 45 with bacteria. CFUs were further reduced by filtering the mixture through a 5 μm filter.

TABLE 8

| Sample | CFU/mL |
|---|---|
| *Lactobacillus brevis* culture - start | $1.05 * 10^5 \pm 2.50 * 10^3$ |
| *Lactobacillus brevis* culture - mixing | $1.23 * 10^5 \pm 2.50 * 10^3$ |
| Sample 4 (mixing) | $3.22 * 10^4 \pm 4.77 * 10^3$ |
| Sample 43 (mixing) | $3.43 * 10^4 \pm 5.67 * 10^3$ |
| Sample 45 (mixing) | $5.55 * 10^2 \pm 4.50 * 10^1$ |
| FW12 (DE) | $8.60 * 10^4 \pm 4.75 * 10^3$ |
| Filtered Sample 4 | TFTC |
| Filtered Sample 43 | TFTC |
| Filtered Sample 45 | TFTC |

Example 9

Test of Antimicrobial Activity (*E. coli*)

Microorganism tested: *E. coli* (MG1655)
Filter media tested: FW12, samples 43, 1, 4, 6, 44 and 45.
Protocol:
0.5 g Filter Media/5 mL Feed (=10% solid).
1. An *E. Coli* culture (not yet in stationary phase) was diluted to ~$10^5$ CFU/mL (based on 1 $OD_{600} \approx 5*10^8$ CFU/mL) in two steps—the first dilution was made in sterile LB media, the second in sterile PBS (this was the Feed).
2. Serial dilutions (in 0.9% w/v NaCl) of the Feed were made.
3. 100 μL of the diluted feed samples were plated on LA plates, to determine the actual starting CFU/mL.
4. Filter media and 10 mL feed were mixed in a sterile 125 mL baffled flask for 2 hours at 25° C., 200 rpm (¾ inch stroke).
5. Serial dilutions (in 0.9% w/v NaCl) of mixed samples were made and 100 μl of each was plated on LA plates, and incubated overnight at 30° C.
6. Plates were counted.

Results:

The results are summarized in Table 9.

TABLE 9

| Sample | CFU/mL |
|---|---|
| MG1655 - start | $6.80 * 10^4 \pm 4.00 * 10^3$ |
| MG1655 - mixing | $5.35 * 10^5 \pm 2.50 * 10^4$ |
| diatomaceous earth | $2.28 * 10^5 \pm 1.72 * 10^5$ |
| Sample 43 | $9.05 * 10^3 \pm 5.50 * 10^2$ |
| Sample 1 | $1.28 * 10^3 \pm 2.45 * 10^2$ |
| Sample 4 | $1.73 * 10^4 \pm 2.03 * 10^3$ |
| Sample 6 | TFTC |
| Sample 44 | $2.70 * 10^3 \pm 1.23 * 10^2$ |
| Sample 45 | $5.20 * 10^3 \pm 2.00 * 10^2$ |

Example 10

Test of Antimicrobial Activity and Filtration
(*Lactobacillus brevis*)

Microorganism tested: *Lactobacillus brevis* type strain (ATCC#14869)
Filter media tested: Samples 43, 4, and 44
Protocol:
0.5 g Filter media/5 mL Feed (=10% solid)
1. A *Lactobacillus* brevis culture was diluted to ~$10^5$ CFU/mL (based on 1 $OD_{600} \approx 2.7*10^8$ CFU/mL) in two steps—the first dilution was made in sterile *Lactobacillus* MRS broth, the second in sterile PBS (this was the Feed).
2. Serial dilutions (in 0.9% w/v NaCl) of the Feed were made.
3. 100 µL of the diluted samples were plated on *Lactobacillus* MRS broth plates, to determine the actual starting CFU/mL.
4. Filter media and 5 mL Feed were mixed in a sterile 15 mL conical tube for 2 hours at 25° C., 250 rpm (½ inch stroke).
5. Serial dilutions (in 0.9% w/v NaCl) of mixed samples were made and plated on *Lactobacillus* MRS broth plates (100 µl each).
6. All samples were filtered through 5 µm syringe filter.
7. Serial dilutions (in 0.9% w/v NaCl) of filtered samples were made and plated on *Lactobacillus* MRS broth plates.
8. Plates were counted in a candle jar at 30° C. for 2 days.
9. Plates were counted.
Results:
The results are summarized in Table 17. CFUs were reduced by mixing Samples 4, 43, and 44 with bacteria. CFUs were further reduced by filtering the mixture through a 5 µm filter.

TABLE 10

| Sample | CFU/mL | CFU/mL (filtered) |
|---|---|---|
| ATCC#14869 - start | $2.83 * 10^4 \pm 4.67 * 10^3$ | |
| ATCC#14869 - mixing | $4.00 * 10^4 \pm 2.00 * 10^3$ | $1.27 * 10^4 \pm 5.80 * 10^2$ |
| Sample 43 | $4.55 * 10^3 \pm 3.50 * 10^2$ | $2.40 * 10^3 \pm 2.00 * 10^2$ |
| Sample 4 | $1.95 * 10^2 \pm 5.00 * 10^0$ | TFTC |
| Sample 44 | $8.10 * 10^2 \pm 1.40 * 10^2$ | $5.50 * 10^1 \pm 5.00 * 10^0$ |

Example 11

Test of Antimicrobial Activity (*Lactobacillus brevis*)

Microorganism tested: *Lactobacillus brevis*
Filter media tested: Samples 48, 50, 51, and 52.
Protocol:
1. *Lactobacillus brevis* (gram positive) culture was streaked on MRS agar and incubated anaerobically at 26° C. until growth was sufficient.
2. Working inoculum was prepared by diluting colonies from the MRS plates into 0.1% peptone, targeting 5×104 cfu/mL.
3. 0.5 g filter media was added to 10 mL inoculum in a 30 mL glass tube (5%).
4. The glass tube was sealed and incubated at room temperature for 30 minutes with mixing (8 inversions/minute).
5. Serial dilutions of 1:10 were prepared in 0.9% NaCl and plated with MRS agar, using the pour plate method to enumerate bacterial population.
6. Plates were incubated at 26° C., anaerobically (GasPak), until growth was sufficient to count.
7. Plates that had 20-200 colonies were counted. The Results are summarized in Table 11.

Example 12

Test of Antimicrobial Activity (*Acetobacter pasteurianus* (Gram Negative))

Microorganism tested: *Acetobacter pasteurianus* (gram negative)
Filter media tested: Samples 48, 50, 51, and 52.
Protocol:
1. *Acetobacter pasteurianus* (gram negative) culture was streaked onto MRS agar and incubated aerobically at 27° C. until growth was sufficient.
2. Culture was stocked by adding 1 mL loop of agar plate colonies to 99 mL of MRS broth and incubated at 27° C.
3. Working inoculum was made by diluting an aliquot of the MRS stock culture into either phosphate buffered saline (PBS) or 0.1% peptone.
4. 0.5 g of filter media was added to 10 mL inoculum in a 30 mL glass tube.
5. The glass tube was sealed and incubated at room temperature for 30 minutes with mixing (8 inversions/minute).
6. Serial dilutions of 1:10 were performed in 0.1% peptone and plated with MRS agar, using the pour plate method to enumerate bacterial population.
7. Plates were counted at 27° C., aerobically, until growth was sufficient to count.
8. Plates that had 20-200 colonies were counted. The Results are summarized in Table 11.

Example 13

Test of Antimicrobial Activity (*Saccharomyces diastaticus* (Yeast))

Microorganism tested: *Saccharomyces diastaticus* (yeast)
Filter media tested: Samples 48, 50, and 51.
Protocol:
1. *Saccharomyces diastaticus* (yeast) culture was streaked onto YM agar and incubated aerobically at 30° C. until growth was sufficient.
2. Working inoculum was prepared by diluting colonies from the YM plates into phosphate buffered saline (PBS), targeting 3×104 cfu/mL.
3. 0.5 g to filter media was added to 10 mL inoculum in a 30 mL glass tube.
4. The glass tube was sealed and incubated at room temperature for 30 minutes with mixing (8 inversions/minute).
5. Serial dilutions of 1:10 were performed in 0.9% NaCl and plated with MRS agar, using the pour plate method to enumerate bacterial population.
6. Plates were incubated at 30° C., aerobically, until growth was sufficient to count.
7. Plates that had 20-200 colonies were counted. The Results are summarized in Table 11.

TABLE 11

| Sample No. | Treatment | Silica Type | Lactobacillus Brevis, grams positive (+) % Reduction | Acetobacter pasteurinus, gram negative (-) % Reduction | Saccharomyces distaticus, yeast % Reduction |
|---|---|---|---|---|---|
| 48 | 3-(N-styrylmethyl-2-aminoethylamino)-propyltrimethoxy-silane hydrochloride | RiceSil 100 | 100% | 18% | 41% |
| 51 | 3-trihydroxysilylpropyl-methyl phosphonate, sodium salt | RiceSil 100 | 20% | 10% | 33% |
| 50 | N-(2-Aminoethyl)-3-aminopropyltrimethoxy-silane Glycidyltrimethyl-ammonium chloride | RiceSil 100 | 90% | 20% | 3% |
| 52 | N-Octadecyldimethyl(3-Trimethoxysilylpropyl)ammonium chloride | RiceSil 100 | 100% | 90% | |

Example 14

Treatment of Beer

Silane-treated silica samples were washed once to remove any impurities. Each sample to be tested (0.3 g) was weighed out and placed into a 50 mL polypropylene centrifuge tube. 10 mL MilliQ water was added to each tube and mixed with the sample at 50 rpm on a gel shaker for 15 minutes at room temperature. The tubes were then centrifuged for 15 minutes at 3000 rpm in a table-top centrifuge. Liquid was then carefully decanted and the tubes were placed in a 50° C. vacuum oven, 20 in Hg, overnight, to remove excess moisture.

Beer (Decarbonated Belk's ESB Ale from Anderson Valley Brewing Company) was decarbonated by addition of 8% (v/v) tributyl phosphate according to ASBC Method Beer, 1D. 30 ml of decarbonated beer was aliquoted into each 50 mL polypropylene centrifuge tubes containing silane-treated silica sample. Tubes were inverted and then agitated for 3 hours at room temperature, on a gel shaker set to 50 rpm. Following incubation, the tubes were centrifuged for 15 minutes at 3000 rpm in a tabletop centrifuge to pellet the suspended material. Each treated beer sample was then filtered through a 5 μm syringe filter (Sartoris, Minisart, #17594) to remove any additional suspended material.

Example 15

Protocol for Measuring Total Polyphenol

1. Materials
   Preparation of Carboxymethylcellulose (CMC/EDTA) Reagent
   Slowly add 2.5 g CMC (1% low viscosity carboxymethylcellulose sodium salt) to approximately 100 mL MilliQ $H_2O$ in beaker with stirring.
   Add 0.5 g EDTA
   Leave mixture at room temperature for about 1-3 hours with stirring until CMC is completely dissolved; centrifuge if needed.
   Ferric Reagent: 3.5% Green ammonium ferric citrate.
   Ammonia Reagent: Dilute Ammonia Solution, Strong (J. T. Baker) with 2 volumes of $H_2O$.
2. Procedures for Beverage Samples
   Pipette 2 mL beverage sample (1% w/v) and 1.6 mL CMC/EDTA Reagent into 13×100 mm glass tubes.
   Add 100 μL Ferric Reagent and vortex
   Add 100 μL Ammonia Reagent and vortex
   Add 1.2 mL MilliQ $H_2O$ and vortex
   Leave mixture at room temperature for 10 minutes
   Measure absorbance at 600 nm
   Total polyphenol (mg/L) is calculated by multiplying the absorbance at 600 nm by 820. Total polyphenols are reported in whole numbers.
3. Procedures for Blank Control.
   Pipette 2 mL beverage sample and 1.6 mL CMC/EDTA Reagent. into tubes.
   Add 100 μL Ammonia Reagent and mix thoroughly.
   Add 1.3 mL MilliQ $H_2O$ and vortex.
   Leave mixture at room temperature for 10 minutes.
   Measure absorbance and use it as blank control for sample.

Example 16

Protocol for Measuring Total Protein

Total protein concentration is measured by BCA. The peptide bonds reduce $Cu^{2+}$ to $Cu^+$ under alkaline conditions; each $Cu^+$ then chelates two molecules of bichoninic acid (BCA). Protein-to-protein variation of this assay is low because the copper reacts with the proteins via the peptide bonds rather than specific amino acid side chains that vary from protein to protein. Therefore, the BCA assay is chosen to measure total protein of beer.

The BCA assay is performed after an optional sample clean-up step using Compat-Able™ Protein Assay Preparation Reagent Set (Pierce catalog no. 23215), following the manufacturer's instructions. The clean-up step allows one to remove interfering non-protein sample components by selectively precipitating the protein, allowing the interfering components to be removed with the supernatant. The purified protein pellet is resolubilized, and assayed with a standard BCA assay procedure (BCA Protein Assay Kit, Pierce catalog no. 23227).

Example 17

Protocol for Measuring Hydrophobic Protein

The hydrophobic Protein is measured by Bradford assay using Protein Assay Dye Reagent Concentrate (Bio-Rad catalog no. 500-0006), following manufacturer's instructions. Under acidic conditions, the absorbance of Coomassie® Blue G-250 shifts from 465 nm to 595 nm upon binding to proteins. The Coomassie® dye binds predominantly to hydrophobic and positively charged proteins.

Example 18

Total Polyphenol, Total Protein, and Hydrophobic Protein in Treated Beer

The total polyphenol, total protein, and hydrophobic (foam active) protein of each treated beer (Example 14) were measured according to the protocols of Examples 15-17. The actual concentration of total polyphenol, total protein, and hydrophobic protein in treated beer are shown in Table 12. In addition, the percent decrease of total polyphenol, total protein, and hydrophobic protein in treated beer is shown in Table 12.

TABLE 12

| Silica Sample Number | Silane Type | Actual Concentration in Treated Beer Sample | | | Percent Decease Compared with untreated beer | | |
|---|---|---|---|---|---|---|---|
| | | Polyphenol mg/L | Total Protein ug/mL | Foam Protein ug/mL | Polyphenol % | Total Protein % | Hydrophobic Protein % |
| 68 | trimethoxysilylpropyl-ethylenediamine, triacetic acid, trisodium salt | 283 | 649 | 127 | 10% | 0% | 27% |
| 69 | N-trimethoxysilylpropyl-N,N,N—Cl, trimethylammonium chloride | 246 | 721 | 142 | 22% | 0% | 18% |
| 70 | 2-(4-chlorosulfonylphenyl)-ethyltrichlorosilane | 297 | 560 | 48 | 5% | 3% | 72% |
| 71 | 3-(N-styrylmethyl-2-aminoethylamino)-propyltrimethoxysilane hydrochloride | 225 | 530 | 85 | 28% | 8% | 51% |
| 72 | triethoxysilylpropylethyl-carbamate | 280 | 713 | 107 | 11% | 0% | 39% |
| 73 | N-(triethoxysilylpropyl)-O-polyethylene oxide urethane | 176 | 630 | 155 | 44% | 0% | 11% |
| 74 | 3-trihydrosilylpropylmethylphosphonate, sodium salt | 278 | 482 | 97 | 11% | 16% | 44% |
| 75 | Bis-(2-hydroxyethyl)-3-aminopropyltriethoxysilane | 340 | 586 | 119 | 0% | 0% | 31% |
| 76 | N-(3-triethoxysilylpropyl)-4,5-dihydroimidazole | 176 | 630 | 132 | 44% | 0% | 24% |
| 77 | ((chloromethyl)phenylethyl)trimethoxysilane | 303 | 734 | 111 | 4% | 0% | 36% |
| 78 | 3-aminopropyltrimethoxysilane, then N-(triethoxysilylpropyl)-O-polyethylene oxide urethane | 311 | 499 | 115 | 1% | 13% | 34% |
| 79 | 3-trihydrosilylpropylmethylphosphonate, sodium salt, then N-(triethoxysilylpropyl)-O-polyethylene oxide urethane | 298 | 489 | 124 | 5% | 15% | 28% |
| 80 | N-trimethoxysilylpropyl-N,N,N—Cl, trimethylammonium chloride then (3-glycidoxypropyl)trimethoxysilane | 284 | 444 | 132 | 10% | 23% | 24% |
| 81 | 3-trihydrosilylpropylmethylphosphonate, sodium salt, then bis-(2-hydroxyethyl)-3-aminopropyltriethoxysilane | 271 | 459 | 103 | 14% | 20% | 41% |
| 82 | 3-(N-styrylmethyl-2-aminoethylamino)-propyltrimethoxysilane hydrochloride, then N-(triethoxysilylpropyl)-O-polyethylene oxide urethane | 277 | 297 | 103 | 12% | 48% | 41% |
| 83 | 2-(trimethoxysilylethyl)pyridine | 239 | 768 | 51 | 24% | 0% | 70% |
| 84 | N-(3-triethoxysilylpropyl)-gluconamide | 303 | 533 | 145 | 3% | 7% | 17% |
| 85 | 2-(trimethoxysilylethyl)pyridine then N-(3-triethoxysilylpropyl)-gluconamide | 247 | 358 | 88 | 22% | 38% | 49% |
| 86 | 3-mercaptopropyltriethoxysilane | 272 | 528 | 40 | 13% | 100% | 77% |
| 87 | N-trimethoxysilylpropyl-N,N,N—Cl, trimethylammonium chloride, then | 296 | 479 | 100 | 6% | 17% | 42% |

TABLE 12-continued

| | | Actual Concentration in Treated Beer Sample | | | Percent Decease Compared with untreated beer | | |
|---|---|---|---|---|---|---|---|
| Silica Sample Number | Silane Type | Polyphenol mg/L | Total Protein ug/mL | Foam Protein ug/mL | Polyphenol % | Total Protein % | Hydrophobic Protein % |
| | N-(3-triethoxysilylpropyl)-gluconamide | | | | | | |
| 88 | N-(triethoxysilylpropyl)-4-hydroxybutyramide | 265 | 576 | 30 | 16% | 0% | 83% |
| 89 | 3-(triethoxysilyl)propylsuccinic anhydride | 279 | 769 | 117 | 11% | 0% | 33% |
| 90 | Trimethoxysilylpropyl polyethyleneimine | 289 | 431 | 116 | 8% | 25% | 33% |
| 91 | Tris(3-trimethoxysilylpropyl)isocyanurate | 284 | 444 | 132 | 10% | 23% | 24% |
| 92 | 2-Hydroxy-4-(3-triethoxysilylpropoxy)-diphenylketone | 289 | 530 | 48 | 8% | 8% | 72% |
| 93 | Ureidopropyltrimethoxysilane | 260 | 421 | 117 | 17% | 27% | 32% |
| 94 | O-(propargyloxy)-N-(triethoxysilylpropyl)urethane | 261 | 296 | 55 | 17% | 49% | 68% |
| 95 | 3-(trimethoxysilyl)propyloctadecyldimethylammonium chloride | 279 | 369 | 71 | 11% | 36% | 59% |
| 96 | N-1-phenylethyl-N'-triethoxysilylpropylurea | 262 | 364 | 42 | 17% | 37% | 76% |
| 97 | 3-isocyanatopropyltriethoxysilane | 265 | 494 | 106 | 16% | 14% | 39% |
| 98 | 2-(3,4-epoxycyclohexyl)ethyltrimethoxysilane | 259 | 318 | 75 | 17% | 45% | 57% |
| 99 | N-(3-trimethoxysilylpropyl)pyrrole | 261 | 389 | 52 | 17% | 32% | 70% |
| 100 | Bis[(3-methyldimethoxysilyl)propyl]-polypropylene oxide | 271 | 400 | 119 | 14% | 30% | 32% |
| 101 | N-trimethoxysilylpropyl-N,N,N—Cl, trimethylammonium chloride, then 2-hydroxy-4-(3-triethoxysilylpropoxy)-diphenylketone | 283 | 461 | 129 | 10% | 20% | 26% |
| 102 | Trimethoxysilylpropylisothiouronium chloride | 311 | 457 | 132 | 1% | 21% | 24% |
| 103 | (3-glycidoxypropyl)trimethoxysilane | 329 | 454 | 132 | 0% | 21% | 24% |
| 104 | 3-mercaptopropyltriethoxysilane, then N-(triethoxysilylpropyl)-O-polyethylene oxide urethane | 307 | 363 | 132 | 2% | 37% | 24% |
| 105 | 3-(triethoxysilyl)propylsuccinic anhydride, then N-(triethoxysilylpropyl)-O-polyethylene oxide urethane | 283 | 347 | 63 | 10% | 40% | 64% |
| 106 | trimethoxysilylpropyl-ethylenediamine, triacetic acid, trisodium salt, then N-(triethoxysilylpropyl)-O-polyethylene oxide urethane | 322 | 372 | 123 | 0% | 35% | 29% |
| 107 | 2-(4-chlorosulfonylphenyl)-ethyltrichlorosilane, then N-(triethoxysilylpropyl)-O-polyethylene oxide urethane | 302 | 277 | 34 | 4% | 52% | 80% |
| 108 | 2-(4-chlorosulfonylphenyl)-ethyltrichlorosilane, then Bis-(2-hydroxyethyl)-3-aminopropyltriethoxysilane | 241 | 559 | 141 | 23% | 3% | 19% |

* The value for the ESB beer is based on an average of 25 samples
* 0% means essentially that there was no change after treatment with the instant invention.

Example 19

Effects of Untreated Silica Filter Media, Commercial Stabilizer, and Silane-Treated Filter Sample on Beer Haze Materials
Control Filter Media:
Hot-water-rinsed, untreated RiceLand Rice Hull Ash (RHA)
Hot-water-rinsed, untreated RiceSil 100 RHA
Divergan F PVPP, BASF
Daraclar 920 silica hydrogel, Grace Division code #1000015860
Clarcel CBR3 diatomaceous earth (DE)
Celite Hyflo SuperCel DE
Celite Standard SuperCel DE
Silane-Treated Silica Filter Media (See Table 5C)

Sample No. 71, 3-(N-styrylmethyl-2-aminoethylamino)-propyltrimethoxysilane hydrochloride, ligand on RiceSil 100
Sample No. 71, 3-(N-styrylmethyl-2-aminoethylamino)-propyltrimethoxysilane hydrochloride, ligand on RiceSil 100
Sample No. 76, N-(3-triethoxysilylpropyl)-4,5-dihydroimidazole, ligand on RiceSil100
Sample No. 78, 3-aminopropyltrimethoxysilane then N-(triethoxysilylpropyl)-O-polyethylene oxide urethane, ligand on RiceSil 100
Sample No. 87, N-trimethoxysilylpropyl-N,N,N—Cl, trimethylammonium chloride then N-(3-triethoxysilylpropyl)-gluconamide, ligands on RiceSil 100
Sample No. 88, N-(triethoxysilylpropyl)-4-hydroxybutyramide, ligand on RiceSil 100
Sample No. 93, ureidopropyltrimethoxysilane, ligand on RiceSil 100
Sample No. 99, N-(3-trimethoxysilylpropyl)pyrrole, ligand on RiceSil 100

Other Materials:
Belk's ESB Ale from Anderson Valley Brewing Company
Tributyl phosphate
50 mL polypropylene centrifuge tubes
Table-top centrifuge
Hach 2100AN Turbidimeter with sample cell connected to a unit-containing desiccant (to prevent condensation from interfering with reading)
Glass cells for turbidity measurements prepared with silicone oil
Ice water bath at 0° C.
5 μm syringe filter
30 mL syringe Methods
Wash Treatment of Silane-Treated Filter Media Control filter media and silane-treated filter media samples were washed once to remove any impurities. Each sample was weighed out 0.3 g into a 50 mL polypropylene centrifuge tube. 10 mL of MilliQ water was added, and the samples were mixed at 100 rpm for 15 minutes on a gel shaker at room temperature. The tubes were then centrifuged at 3000 rpm in a bench-top centrifuge for 15 minutes. After the supernatant was gently decanted, each tube was covered with foil. Holes were poked in the foil and the samples were dried in a vacuum oven at 50° C. overnight with 24 inches of Hg.

Wash Treatment of Untreated RHA

To 40 g each of untreated RiceLand RHA and RiceSil 100 RHA, 200 mL of 95° C. MilliQ water was added and mixed on a stir plate for 10 minutes. Each slurry was then filtered over a Buchner funnel lined with a Whatman #4 filter paper until the cake is dry. A total of 600 mL of 95° C. water was poured over the cake, the water was then removed immediately with vacuum. Each RHA cake was placed in a glass beaker covered with foil and dried in a vacuum oven overnight at 50° C., 24 inch Hg.

Beer Treatment

Beer was decarbonated by adding 0.008% tributyl phosphate as described in ASBC method "Beer, 1D". Each control (untreated RHA or DE), commercial stabilizer (PVPP or silica gel), or silane-treated silica sample was weighed out in 50 mL tubes, in duplicate, according to the dosing Table 13. For the first low dose experiment, 0.1% of each filter media, 0.1% of silica hydrogel, and 0.03% PVPP, which are the amounts used commercially, were used to determine their effects on chill haze formation. In the second high dose experiment, 1% of each filter media, 1% of silica hydrogel, and 0.3% PVPP were used to determine their effects on chill haze formation.

TABLE 13

| | Sample | Dosing % (wt./vol.) | Weight of material (g) | Volume of beer (mL) |
|---|---|---|---|---|
| Controls | Beer only | N/A | N/A | 30 |
| | Hot-water rinsed RiceLand | 0.1 | 0.03 | 30 |
| | Hot-water rinsed RiceLand | 1.0 | 0.3 | 30 |
| | Hot-water rinsed RiceSil | 0.1 | 0.03 | 30 |
| | Hot-water rinsed RiceSil | 1.0 | 0.3 | 30 |
| | Clarcel CBR3 DE | 0.1 | 0.03 | 30 |
| | Hyflo Supercel DE | 0.1 | 0.03 | 30 |
| | Standard Supercel DE | 0.1 | 0.03 | 30 |
| | Standard Supercel DE | 1.0 | 0.3 | 30 |
| Commercial Stabilizers | Divergan F PVPP | 0.03* | 0.009 | 30 |
| | Divergan F PVPP | 0.3 | 0.09 | 30 |
| | Daraclar 920 silica gel | 0.1* | 0.03 | 30 |
| | Daraclar 920 silica gel | 1.0 | 0.3 | 30 |
| Silane-Treated Filter Media Samples | Sample 71 (RiceSil) | 0.1 | 0.03 | 30 |
| | Sample 71 (RiceSil) | 1.0 | 0.3 | 30 |
| | Sample 71 (RiceSil) | 0.1 | 0.03 | 30 |
| | Sample 71 (RiceSil) | 1.0 | 0.3 | 30 |
| | Sample 76 (RiceSil) | 0.1 | 0.03 | 30 |
| | Sample 78 (RiceSil) | 0.1 | 0.03 | 30 |
| | Sample 78 (RiceSil) | 1.0 | 0.3 | 30 |
| | Sample 87 (RiceSil) | 0.1 | 0.03 | 30 |
| | Sample 88 (RiceSil) | 0.1 | 0.03 | 30 |
| | Sample 88 (RiceSil) | 1.0 | 0.3 | 30 |
| | Sample 93 (RiceSil) | 0.1 | 0.03 | 30 |
| | Sample 99 (RiceSil) | 0.1 | 0.03 | 30 |
| | Sample 99 (RiceSil) | 1.0 | 0.3 | 30 |

After weighing out the samples in tubes, 30 mL of decarbonated beer was added to each tube, which contained a control, commercial stabilizer, or a silane-treated sample. Each tube was inverted a few times to make sure the control, the commercial stabilizer, or the silane-treated sample became thoroughly wet. The mixtures were agitated on the gel shaker at 100 rpm for 3 hours. Then, tubes were centrifuged at 3000 rpm for 15 minutes and the beer supernatant was filtered through a 5 μm syringe filter.

Haze Analysis

Figure 2:
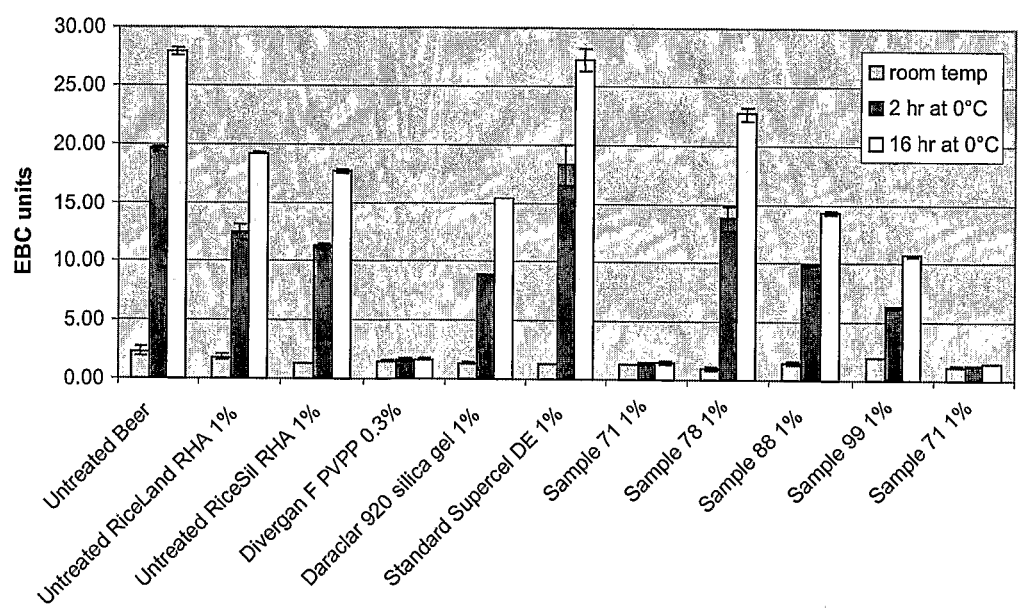
FIG. 2 shows effects of untreated RHA, commercial stabilizers, and silane-treated silica filter media at 0.3 or 1% dose on beer haze.

The Chapon cooling method was used to induce chill haze, based on ASBC method "Beer 27, Physical Stability." Haze of each beer filtrate was measured on the Hach turbidity meter after the filtrates were adjusted to room temperature. The filtrates were then incubated at 0° C. in an ice water bath and the haze was measured again in 2 and 15 or 16 hours. The haze in EBC units of untreated beer, and treated beer at (a) time zero at room temperature, (b) after 2 hours at 0° C., and (c) after 15 hours at 0° C. were shown in Table 14 and FIG. 1 (low dose experiment). The haze in EBC units of untreated beer, and treated beer at (a) time zero at room temperature, (b) after 2 hours at 0° C., and (c) after 16 hours at 0° C. were shown in Table 15 and FIG. 2 (high dose experiment). The cumulative haze increase was calculated by taking the haze in EBC units after 15 or 16 hours at 0° C. (c) subtracted by the haze in EBC unit at time zero at room temperature (a). The percentage haze decrease in each treated beer compared with the non-treated beer is calculated by normalization to the untreated beer.

TABLE 14

(Low Dose)

| Sample | Dosing % (wt/vol) | EBC Units Room temp. Time Zero | EBC Units 2 hr at 0° C. | EBC Units 16 hr at 0° C. | EBC Units Cumum. Haze Increase | % Decrease in haze normalized to beer control |
|---|---|---|---|---|---|---|
| Beer only | na | 1.12 | 16.65 | 26.35 | 25.23 | 0% |
| Riceland Rice Hull Ash | 0.10% | 1.06 | 16 | 25.1 | 24.04 | 5% |
| RiceSil 100 | 0.10% | 1.24 | 17.35 | 25.95 | 24.71 | 2% |
| Divergan F | 0.03% | 1.16 | 2.44 | 6.44 | 5.28 | 79% |
| Daraclar 920 | 0.10% | 1.07 | 14.2 | 22.1 | 21.03 | 17% |
| Clarcel CBR3 | 0.10% | 1.23 | 17.95 | 27.8 | 26.57 | 0% |
| Hyflo Supercel | 0.10% | 1.06 | 16.95 | 28.65 | 27.59 | 0% |
| Standard Supercel | 0.10% | 1.10 | 16.65 | 28.9 | 27.8 | 0% |
| 71 | 0.10% | 1.30 | 11.9 | 22.1 | 20.8 | 18% |
| 76 | 0.10% | 1.31 | 15.35 | 25.2 | 23.89 | 5% |
| 78 | 0.10% | 1.23 | 13.3 | 24.9 | 23.67 | 6% |
| 87 | 0.10% | 1.32 | 16.1 | 27.25 | 25.93 | 0% |
| 88 | 0.10% | 1.27 | 14.25 | 24.55 | 23.28 | 8% |
| 93 | 0.10% | 1.15 | 15.85 | 26.85 | 25.7 | 0% |
| 99 | 0.10% | 1.27 | 13.25 | 24.35 | 23.08 | 9% |
| 71 | 0.10% | 1.22 | 9.81 | 20.35 | 19.13 | 24% |

TABLE 15

(High Dose).

| Sample | Dosing % (wt./vol.) | EBC Units Room Temp Time Zero | EBC Units 2 hr at 0° C. | EBC Units 15 hr at 0° C. | EBC Units Cumm. Haze increase | % decrease in haze normalized to beer control |
|---|---|---|---|---|---|---|
| Beer only | N/A | 2.31 | 19.6 | 27.9 | 25.59 | 0% |
| Riceland Rice Hull Ash | 1.00% | 1.83 | 12.6 | 19.2 | 17.37 | 32% |
| Ricesil 100 | 1.00% | 1.29 | 11.3 | 17.7 | 16.41 | 36% |
| Divergan F | 0.30% | 1.52 | 1.62 | 1.68 | 0.16 | 99% |
| Daraclar 920 | 1.00% | 1.32 | 8.99 | 15.4 | 14.08 | 45% |
| Standard Supercel | 1.00% | 1.3 | 18.3 | 27.3 | 25.95 | 0% |
| Sample 71 | 1.00% | 1.27 | 1.43 | 1.47 | 0.19 | 99% |
| Sample 78 | 1.00% | 1.01 | 13.8 | 22.7 | 21.69 | 15% |
| Sample 88 | 1.00% | 1.42 | 9.83 | 14.3 | 12.88 | 50% |
| Sample 99 | 1.00% | 1.96 | 6.25 | 10.7 | 8.69 | 66% |
| Sample 71 | 1.00% | 1.22 | 1.31 | 1.44 | 0.22 | 99% |

Our results show that after treatment with silane-treated filter media samples 71, 78, 88, and 99 at 1% dose, and with silane-treated filter media sample 71 at 0.10% dose, the haze decrease improves 99, 15, 50, 66, and 24% respectively compared with the untreated beer.

Although the invention has been described with reference to the presently preferred embodiments, it should be understood that various modifications could be made without departing from the scope of the invention.

What is claimed is:

1. A method for preventing haze formation and/or reducing haze from a beverage, comprising the steps of:
   a. filtering a beverage sample through silica filter media whose surface active groups have been reacted with one or more silanes having a functional moiety selected from the group consisting of aryl, epoxy, methacrylate, isothiouronium, sulfonate, phosphonate, isocyano, sulfhydryl, carboxylate, carbonyl, and ionic moiety,
   b. binding one or more haze-forming substances to the silica filter media, and
   c. collecting the beverage sample in flow through.

2. The method according to claim 1, wherein the haze-forming substances are selected from the group consisting of polyphenols and haze-forming proteins.

3. A method for preventing haze formation and/or reducing haze from a beverage, comprising the steps of:
   a. pre-mixing a beverage sample with silica filter media whose surface active groups have been reacted with one or more silanes having a functional moiety selected from the group consisting of aryl, epoxy, methacrylate, isothiouronium, sulfonate, phosphonate, isocyano, sulfhydryl, carboxylate, carbonyl, and ionic moiety, and applying the mixture to a filtration device, b. filtering the beverage sample through the filtration unit comprising the silica filter media,
c. binding one or more haze-forming substances to the silica filter media, and
d. collecting the beverage sample in flow through.

4. The method according to claim 1, wherein said beverage sample is alcoholic, fruit, or vegetable beverage.

5. The method according to claim 4, wherein said alcoholic beverage is beer.

6. The method according to claim 1, wherein said one or more haze-forming substances are bound to the silica filter media through an electrostatic, a hydrophobic, or a hydrophilic interaction.

7. The method according to claim 1, wherein particulates are captured by physical entrapment and/or binding to the silica filter media, and removed from the beverage sample by the filtering step.

8. The method according to claim 7, wherein said particulates are microorganisms, precipitates, inclusion bodies or crystals.

9. The method according to claim 1, wherein said silica filter media are rice hull ash, oat hull ash, or diatomaceous earth.

10. The method according to claim 1, wherein said silane further comprises a hydrolyzable moiety selected from the group consisting of alkoxy, halogen, hydroxy, aryloxy, amino, amide, methacrylate, mercapto, carbonyl, urethane, pyrrole, carboxy, cyano, aminoacyl, acylamino, alkyl ester, aryl ester, which reacts with the active group on the silica filter media.

11. The method according to claim 10, wherein said hydrolyzable moiety is an alkoxy group.

12. The method according to claim 11, wherein said silane is a mono-, di-, or trialkoxysilane.

13. The method according to claim 1, wherein said silane has an aryl moiety and is 3-(trimethoxysilyl)-2-(p,m-chloromethyl)-phenylethane, 2-Hydroxy-4-(3-triethoxysilylpropoxy)-diphenylketone, ((chloromethyl)phenylethyl)trimethoxysilane, or phenyldimethylethoxysilane.

14. The method according to claim 1, wherein said silane has an epoxy moiety and is 3-glycidoxypropyltrimethoxysilane or 2-(3,4-epoxycyclohexyl)ethyltrimethoxysilane.

15. The method according to claim 1, wherein said silane has a methacrylate moiety and is 3-(trimethoxysilyl)propyl methacrylate.

16. The method according to claim 1, wherein said silane has an isocyano moiety and is tris(3-trimethoxysilylpropyl) isocyanurate or 3-isocyanatopropyltriethoxysilane.

17. The method according to claim 1, wherein said silane has a sulfhydryl moiety and is 3-mercaptopropyltriethoxysilane.

18. The method according to claim 1, wherein said silane has an ether moiety and is bis[(3-methyldimethoxysilyl)propyl]-polypropylene oxide.

19. The method according to claim 1, wherein said silane has a carbonyl moiety and is 3-(triethoxysilyl)propylsuccinic anhydride.

20. The method according to claim 1, wherein said silane has a sulfonate moiety and is 2-(4-chlorosulfonylphenyl)-ethyltrichlorosilane.

21. The method according to claim 1, wherein said silane has an isothiouronium moiety and is trimethoxysilylpropyl-isothiouronium chloride.

22. The method according to claim 1, wherein said silane has an ionic moiety and is 3-(trihydroxysilyl)propylmethylphosphonate sodium salt.

23. A method for preventing haze formation and/or reducing haze from a beverage, comprising the steps of:
a. filtering a beverage sample through silica filter media whose surface active groups have been reacted with one or more silanes,
b. binding one or more haze-forming substances to the silica filter media, and
c. collecting the beverage sample in flow through,
wherein said silane-reacted silica filter media have a general formula selected from the group consisting of

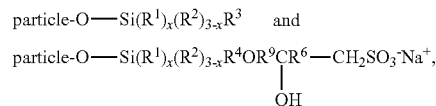

wherein $1 \leq x \leq 3$;
$R^1$ is alkoxy, halogen, hydroxy, aryloxy, carboxy, cyano, alkyl ester, or aryl ester;
$R^2$ is substituted or unsubstituted alkyl, alkenyl, alkaryl, alkcycloalkyl, aryl, cycloalkyl, cycloalkenyl, heteroaryl, heterocyclic, cycloalkaryl, cycloakenylaryl, alkcycloalkaryl, alkcycloalkenyaryl, or arylalkaryl;
$R^3$ is hydrogen, alkyl, alkenyl, alkaryl, alkcycloalkyl, aryl, cycloalkyl, cycloalkenyl, heteroaryl, heterocyclic, cycloalkaryl, cycloakenylaryl, alkcycloalkaryl, alkcycloalkenyaryl, arylakaryl, alkoxy, halogen, hydroxy, aryloxy, alkyl ester, aryl ester, carboxy, sulphonate, cyano, epoxy, phosphonate, isothiouronium, thiouronium, alkyl epoxy, or alkylisothiouronium; wherein the hydrogen of said alkyl, alkenyl, aryl, cycloalkyl, cycloalkenyl, heteroaryl, and heterocyclic is optionally substituted by halogen, hydroxy, carboxy, or cyano;
$R^6$ is hydrogen, substituted or unsubstituted alkyl, alkenyl, alkaryl, alkcycloalkyl, aryl, cycloalkyl, cycloalkenyl, heteroaryl, heterocyclic, cycloalkaryl, cycloakenylaryl, alkcycloalkaryl, alkcycloalkenyaryl, ether, ester or arylalkaryl;
$R^4$ and $R^9$ are substituted or unsubstituted alkyl, alkenyl, alkaryl, alkcycloalkyl, aryl, cycloalkyl, cycloalkenyl, heteroaryl, heterocyclic, cycloalkaryl, cycloakenylaryl, alkcycloalkaryl, alkcycloalkenyaryl, or arylalkaryl radicals capable of forming two covalent attachments.

24. The method according to claim 1, wherein said silane has a functional moiety of aryl, epoxy, or methacrylate.

25. The method according to claim 1, wherein said silane has a functional moiety of sulfonate, phosphonate, or carboxylate.

26. The method according to claim 1, wherein said silane has a functional moiety of sulfhydryl, carbonyl, or ionic moiety.

* * * * *